(12) United States Patent
Ivankovic

(10) Patent No.: US 7,265,506 B2
(45) Date of Patent: Sep. 4, 2007

(54) NOISE IMPROVED LINEAR DC MOTOR CONTROL SYSTEMS AND METHODS

(76) Inventor: Mladen Ivankovic, 2363 Copperwood Dr., Oakville, Ontario (CA) L6M 4S9

( * ) Notice: Subject to any disclaimer, the term of this patent is extended or adjusted under 35 U.S.C. 154(b) by 213 days.

(21) Appl. No.: 10/840,382

(22) Filed: May 7, 2004

(65) Prior Publication Data

US 2005/0134205 A1    Jun. 23, 2005

Related U.S. Application Data

(60) Provisional application No. 60/469,591, filed on May 9, 2003.

(51) Int. Cl.
*H02P 1/00* (2006.01)
(52) U.S. Cl. .................. 318/135; 318/114; 318/807; 318/779; 363/21.1; 363/21.18
(58) Field of Classification Search ............... 318/430, 318/431, 778, 779, 807, 808, 812, 825, 827, 318/114, 119, 126–129; 363/21.1, 21.11, 363/21.18, 26; 388/805, 806
See application file for complete search history.

(56) References Cited

U.S. PATENT DOCUMENTS

| | | | |
|---|---|---|---|
| 4,129,810 A | 12/1978 | Harshberger, Jr. | 318/317 |
| 4,763,059 A * | 8/1988 | Espelage et al. | 318/811 |
| 4,975,823 A * | 12/1990 | Rilly et al. | 363/21.16 |
| 5,747,956 A | 5/1998 | Lamm | 318/599 |
| 5,781,385 A | 7/1998 | Permuy | 361/30 |
| 6,833,990 B2 * | 12/2004 | LaCroix et al. | 361/688 |
| 2003/0063900 A1 | 4/2003 | Wang et al. | 388/806 |

FOREIGN PATENT DOCUMENTS

EP        0 689 986 A1    1/1996

* cited by examiner

*Primary Examiner*—Rina Duda
(74) *Attorney, Agent, or Firm*—Winston & Strawn LLP

(57) ABSTRACT

A linear power controller and related circuitry may be implemented to provide linear control of a variable DC electric motor. The controller and motor are coupled to form a closed loop for controlling the speed of the motor and for adjusting or compensating for noise and other characteristics having a negative impact on performance. The circuitry is configured to have a crossover frequency that is below the motor noise frequency. The configuration of the crossover frequency may allow for the motor or the controller to be implemented without additional circuitry to filter or compensate for motor noise.

17 Claims, 28 Drawing Sheets

NYQUIST CHARTS:
NEW LOOP:

OLD LOOP:

NOISE IMPROVED LINEAR DC MOTOR CONTROL SYSTEMS AND METHODS

CROSS-REFERENCE TO RELATED APPLICATION

This application claims the benefit of U.S. Provisional Patent Application No. 60/469,591, filed May 9, 2003, which is hereby incorporated by reference herein in its entirety.

FIELD OF THE INVENTION

A system, methods, and apparatus for inhibiting or avoiding motor noise using circuitry design while avoiding the need for conventional filtering.

BACKGROUND OF THE INVENTION

Various techniques for controlling and operating DC variable speed electric motors are implemented in conventional systems. Such techniques are sometimes implemented specifically in the context of automobiles, and specifically for the heating, ventilating, and air conditioning ("HVAC") systems in automobiles to control and operate a DC motor component of the system. In many such instances, circuitry is implemented to provide a linear motor speed response with respect to a control signal.

Motor noise is generally a problem in such systems, particularly in the context of an HVAC system. Some known systems employ filter circuitry integrated with a motor to improve, i.e., reduce, motor noise. Some of the disadvantages of such techniques are that it adds to the cost of manufacture (e.g., the fewer components in the motor in the system, potentially the less costly to produce) and adds to the complexity of designing systems around the motor. More complicated systems have a tendency to require additional repair or replacement, as well.

To implement linear control for the motor in such systems, circuitry that establishes a control loop with the motor is sometimes implemented. The implementation of a control loop may often need to meet various criteria of its own that may exist irrespective of considerations for the motor. For example, the control loop may need to sufficiently vary a supply current to meet system requirements and may need to address concerns in variation and noise in battery signals.

Thus, it is desired to provide linear motor control that avoids the disadvantage of requiring filter circuitry.

SUMMARY OF THE INVENTION

In accordance with the principles of the present invention, system and methods are provided for controlling an electric motor. A linear power controller such as a linear power module can be configured and adapted to form a control loop when operably connected to an electric motor and is configured and adapted to have a crossover frequency that is below a motor noise frequency of the electric motor. Power is applied to the controller to control the speed of the motor with the controller (e.g., to hold the speed at variable fixed speeds). The linear motor controller is, for example, a part of an HVAC system. The circuitry may be configured to power the linear motor controller and the motor with a battery. If desired, the linear motor controller is implemented using an ASIC that controls the speed of the motor. The crossover frequency is preferably configured and adapted to be substantially below the motor noise frequency (e.g., as low as possible) and above a frequency at which there is a rush of current (e.g., an overcurrent) during motor startup or other negative consideration may take place (e.g., slightly above such frequency). The linear motor controller may include a power semiconductor device such as a MOSFET.

BRIEF DESCRIPTION OF THE DRAWINGS

Further features of the invention, its nature, and various advantages will be more apparent from the following detailed description, taken in conjunction with the accompanying drawings in which like reference characters refer to like parts throughout, and in which.

DETAILED DESCRIPTION OF PREFERRED EMBODIMENTS

Figure 1:
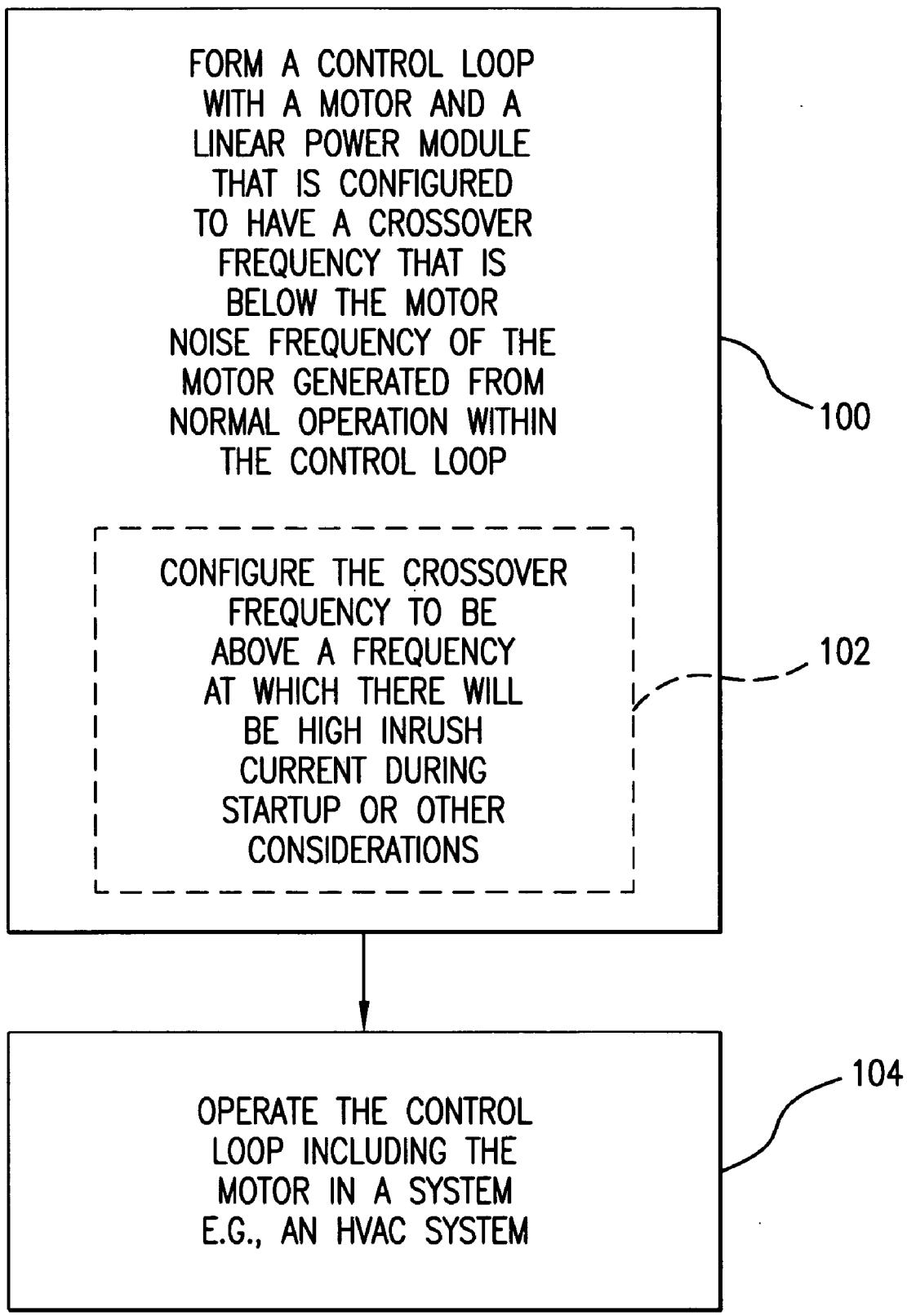
FIG. 1 is a flow of chart of illustrative steps involved in configuring a close loop for controlling a motor in accordance with one embodiment of the present invention.

A linear motor controller, such as a linear power module ("LPM"), has now been invented for use in control systems for controlling and operating DC motors by acting as a power source that generates a voltage that is applied to a DC motor. Circuitry arranged to form the linear motor controller (e.g., LPM) can be configured and adapted to establish a control loop with a motor. Examples of illustrative techniques for implementing such control systems, or parts thereof, are shown in shown in U.S. Pat. No. 5,781,385 to Permuy issued on Jul. 14, 1998, U.S. Pat. No. 5,747,956 to Lamm issued May 5, 1998, U.S. Patent Publication No. U.S. 2003/0063900 A1 of Wang et al., and U.S. patent application Ser. No. 10/307,987; Filed: Dec. 3, 2002, which are hereby incorporated herein in their entirety by express reference thereto.

A linear motor controller can include a power semiconductor device, such as a MOSFET, that under certain circumstances operates a current source in the control loop. The linear motor controller can operate as a voltage source or a current source in operation in the closed loop. The frequency at which the crossover from a voltage source to a current source occurs is referred to as the crossover frequency. Below that crossover frequency the linear motor controller acts as a voltage source, above that frequency, the linear motor controller acts as a current source. There are benefits to each mode. For example, operating as a current source minimizes battery current noise, while operating as a voltage source aids in controlling motor speed. Without the control loop, from a control perspective, the combination of the MOSFET and battery is considered a controlled current source in that by changing the drive voltage (the voltage between the gate and drain of the MOSFET), the current through the circuit is changed. With a control, the circuit via the MOSFET can be configured to operate as a voltage source where the motor voltage is proportional to the control voltage (Chin signal in FIG. 2). The transition frequency in the circuit with the control loop from operating as voltage source to operating as current source is the control loop crossover frequency.

Research and experiments have shown an unexpected result in that the solution to this situation is to choose a control loop crossover frequency that is below the motor noise frequency. Therefore, the circuitry is configured to have a crossover frequency that is below the motor noise frequency and preferably, as far below the motor noise frequency as possible. There are considerations for the lower bound for the crossover frequency. One consideration in an HVAC system is that the control loop will need to compensate for slow changes in the battery voltage in order to keep the motor voltage constant during operation. For example, in HVAC systems, the circuitry is configured and adapted so that motor speed "will not see" any changes in the battery voltage occurring at above 10 Hz. Another consideration is that setting the crossover frequency at a level that is too low may cause a high inrush of current during startup. In an HVAC system, this condition can occur at 10 Hz.

Thus, the crossover frequency is preferably set to be substantially below the motor noise frequency and slightly above frequencies at which there may be a sudden inrush of current or at which the speed of the motor will be affected by slow changes in the voltage source over time. For example, in an HVAC system, the lower limit for the crossover frequency may be about 10 Hz. Motor noise frequency can vary, for example, based on the motor, the speed of operation, etc. In HVAC systems, motor noise typically has a frequency in the range of 50 to 500 Hz, which depends on motor speed. For convenience and clarity, the present invention is primarily described in the context of LPMs and HVAC systems. However, this is not to be understood as the only application of the present invention as is illustratively described herein, and the invention can be applied to a variety of other applications such as those typically requiring the use of filtering circuitry or where it is desired that the motor be at least substantially free or entirely free of motor noise.

Illustrative steps involved in operating a DC motor with improved noise performance (e.g., at least substantially free, preferably entirely free, of motor noise) are shown in FIG. 1. At step 100, a control loop is formed by a motor (e.g., a variable speed DC motor) and an LPM is configured and adapted to have a crossover frequency that is below the motor noise frequency of the motor generated from normal operation within the control loop (e.g., generated from expected speeds at which the motor is to be normally operated). Step 100 may include step 102 for configuring and adapting the crossover frequency to be above a frequency at which there will be a high inrush, or a rush, of current during startup or above frequencies where there may be other considerations. A high inrush or rush of current may damage one or more system components. At step 104, the control loop is implemented to operate the motor and to control the speed at which the motor is operating (e.g., in an HVAC system). The control loop may be of the type that is configured and adapted to operate the motor at a number of fixed discrete speeds (e.g., low, medium, high). The control loop may also be applied or implemented in other systems.

Figure 2:
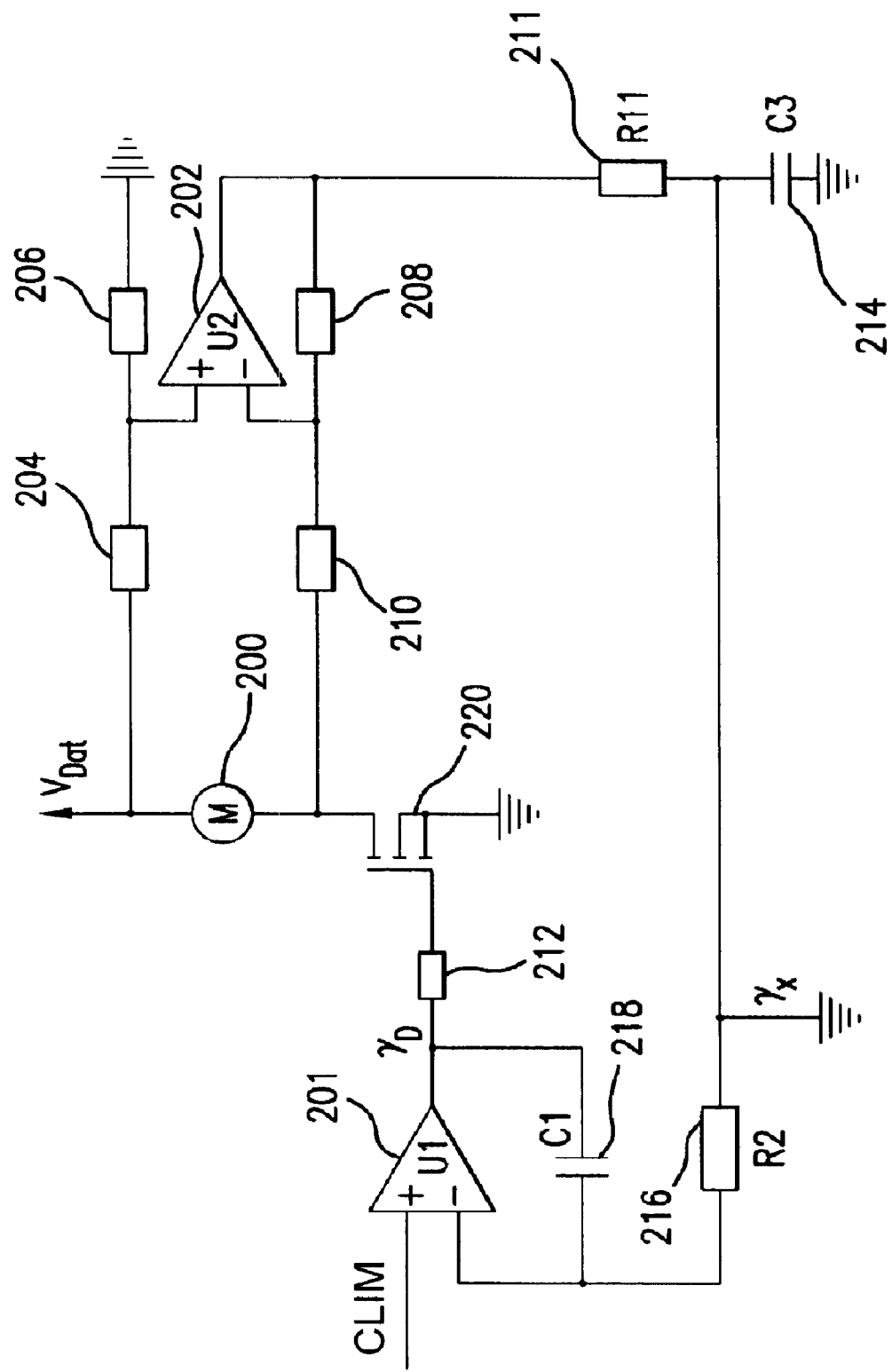
FIG. 2 is a circuit diagram of an illustrative circuit for implementing a close loop in accordance with one embodiment of the present invention.
Figure 3:
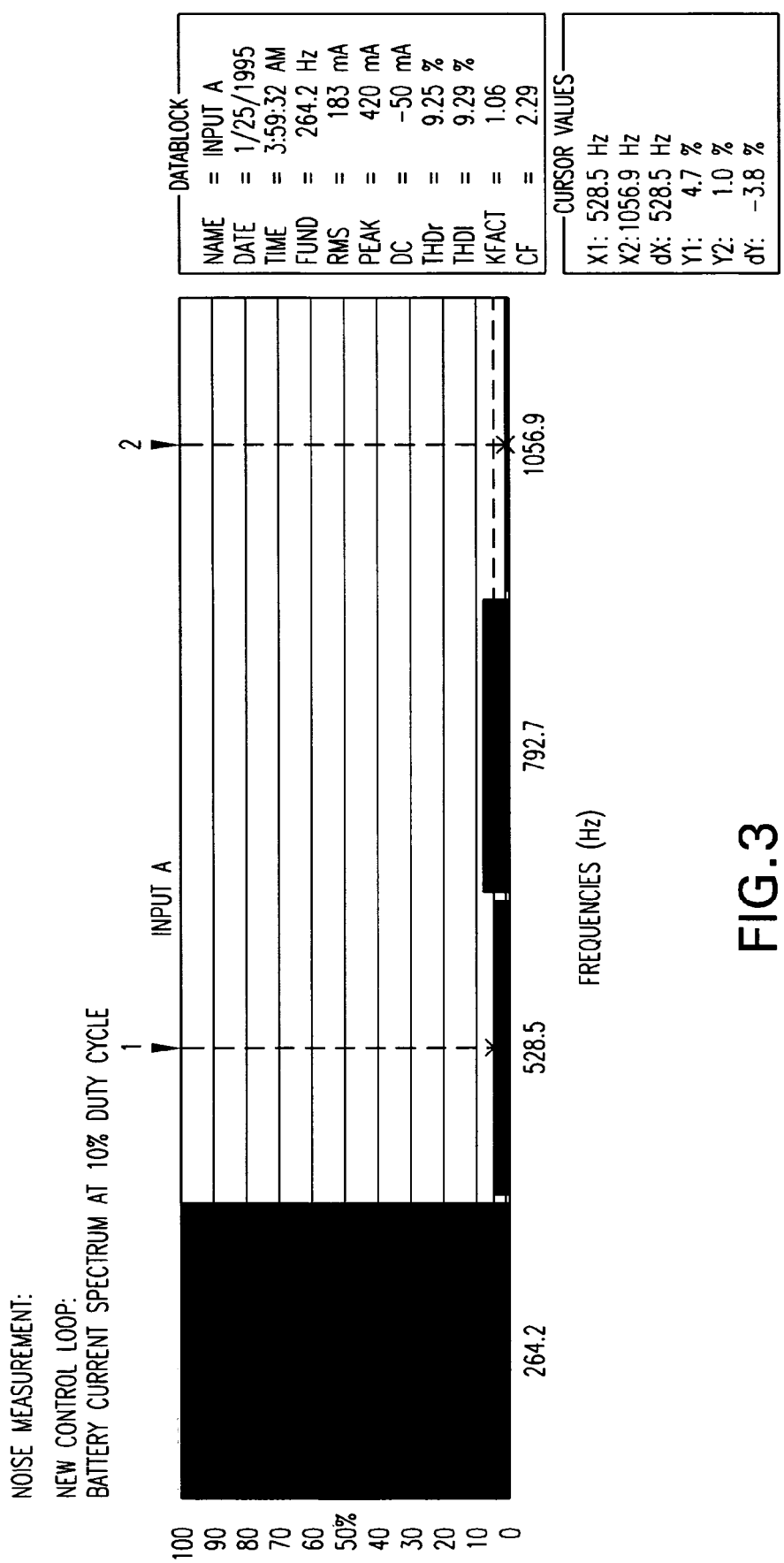
FIG. 3 illustrates a battery current spectrum at 10% duty cycle according to one embodiment of the present invention.
Figure 4:
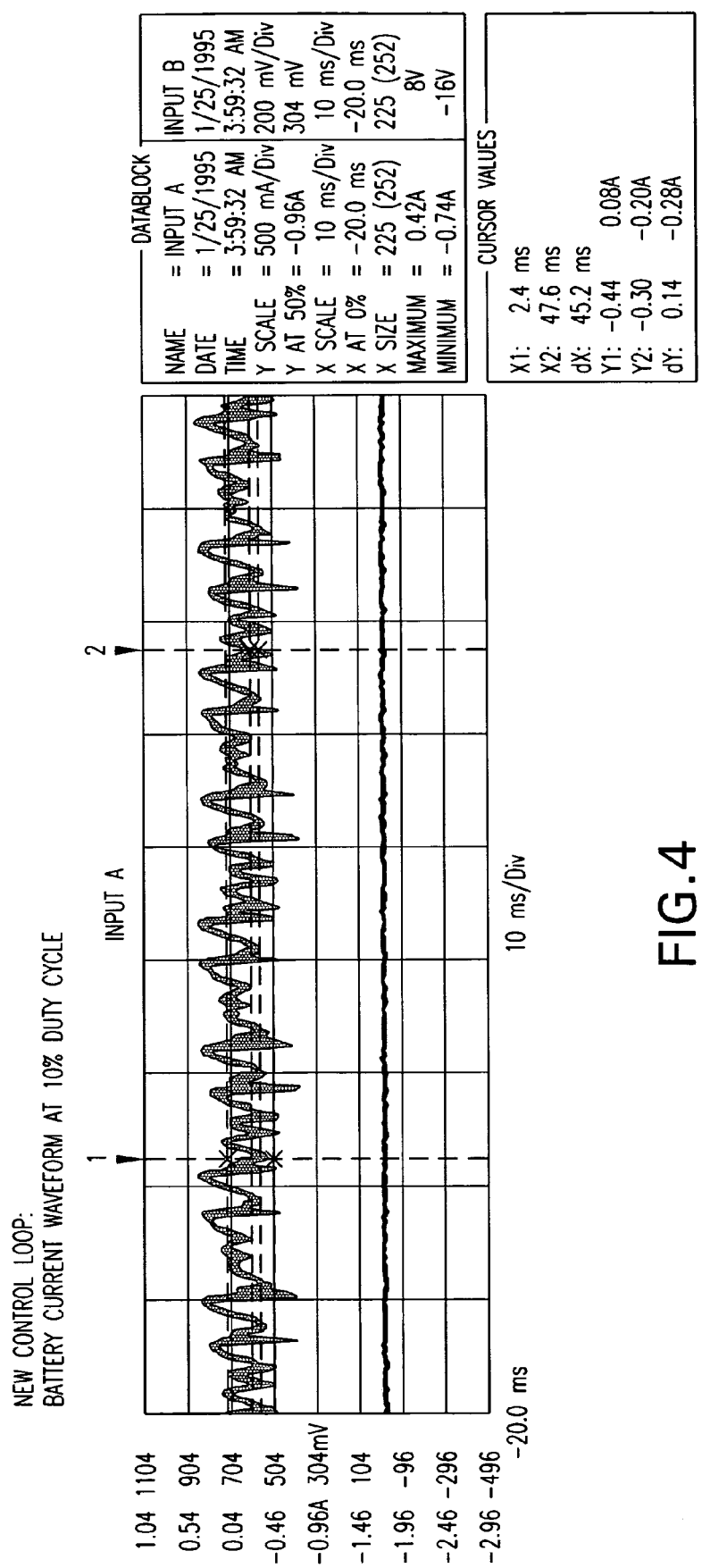
FIG. 4 illustrates a battery current waveform at 10% duty cycle according to one embodiment of the present invention.
Figure 5:
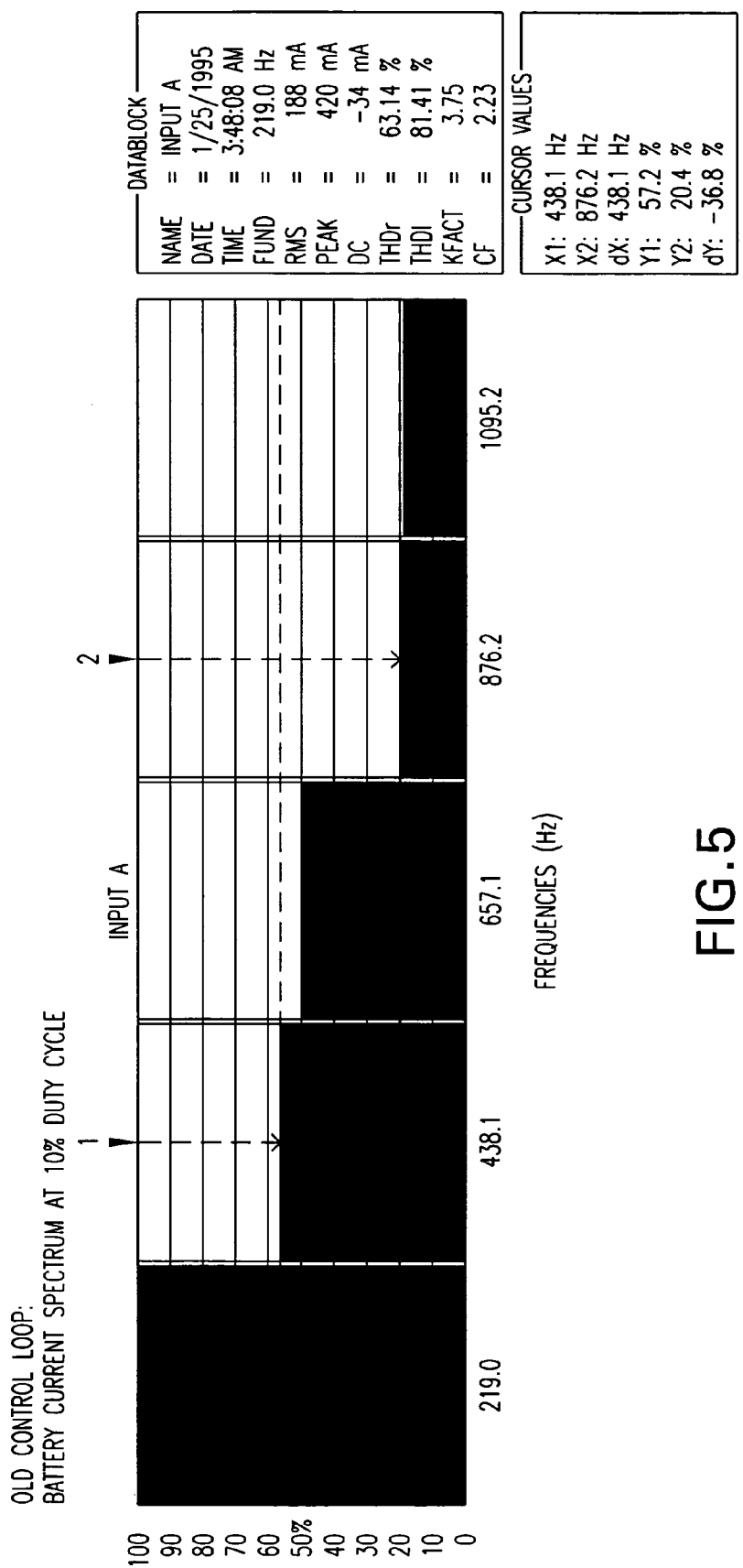
FIG. 5 illustrates a prior art battery current spectrum at 10% duty cycle.
Figure 6:
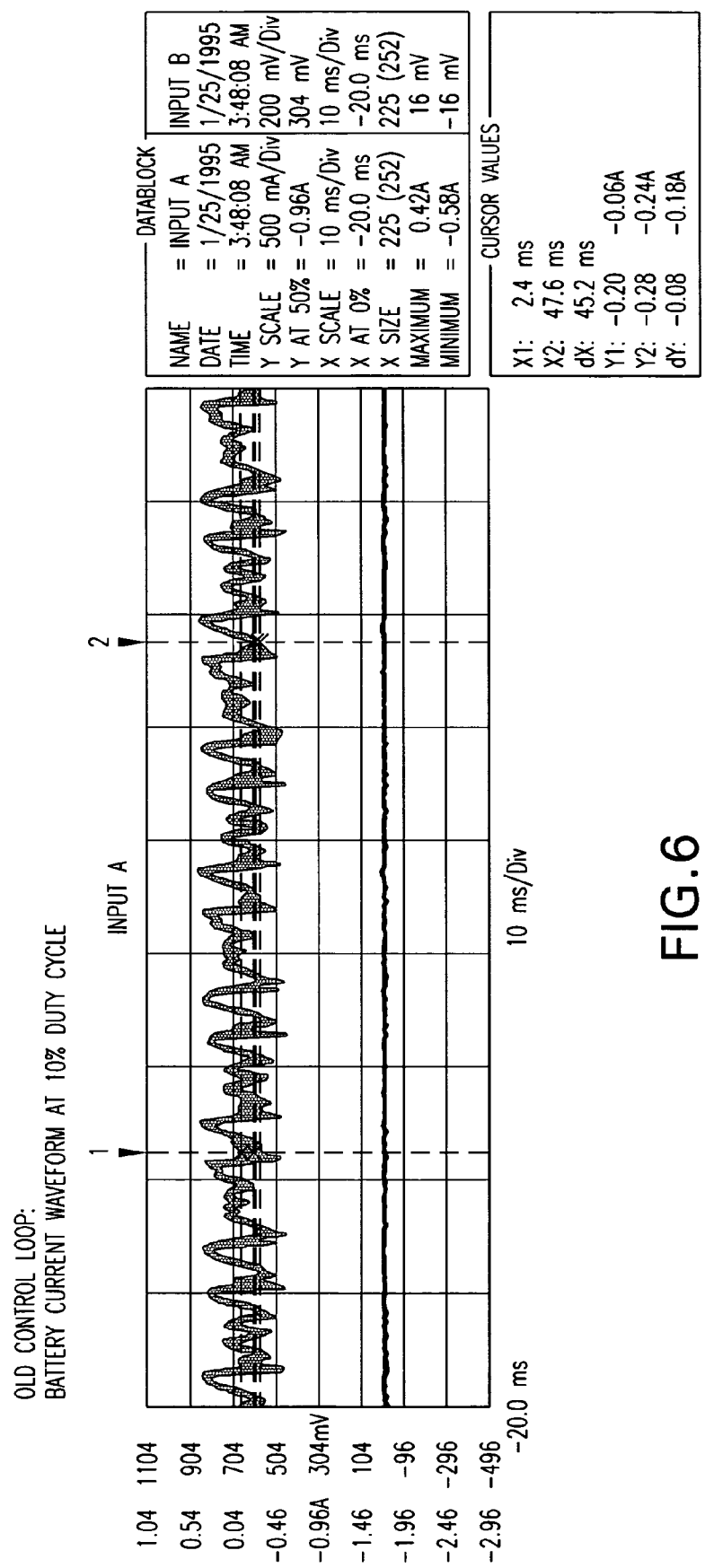
FIG. 6 illustrates a prior art battery current waveform at 10% duty cycle.
Figure 7:
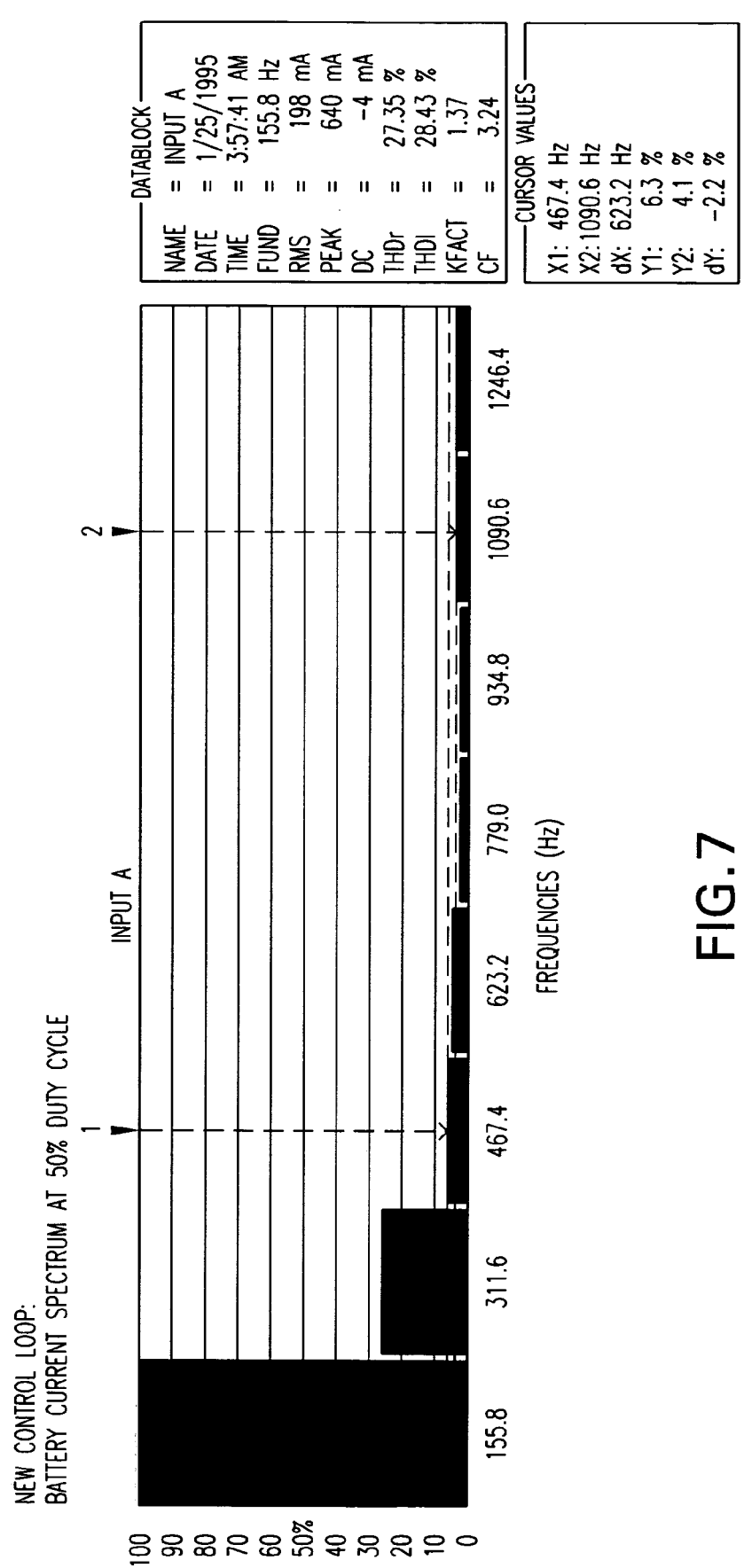
FIG. 7 illustrates a battery current spectrum at 50% duty cycle according to one embodiment of the present invention.
Figure 8:
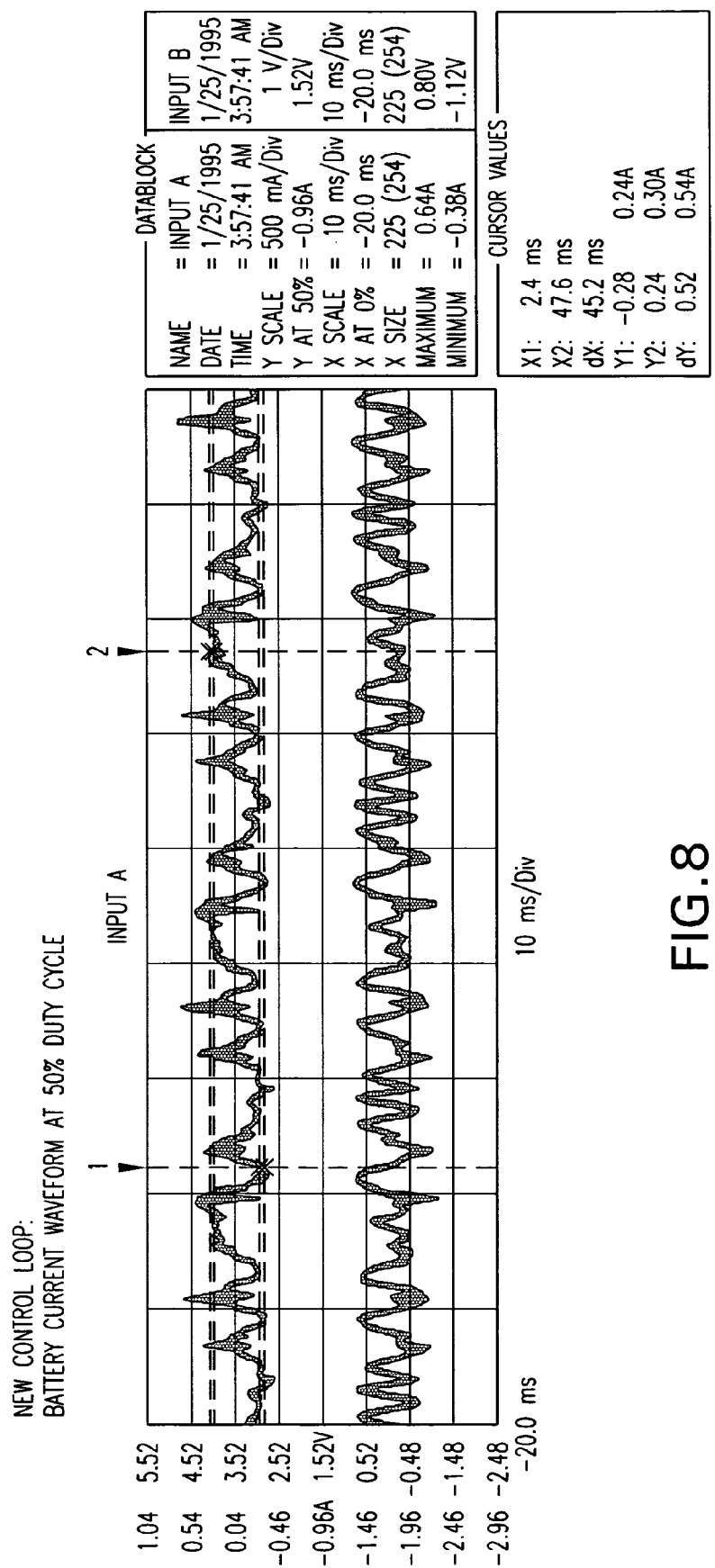
FIG. 8 illustrates a battery current waveform at 50% duty cycle according to one embodiment of the present invention.
Figure 9:
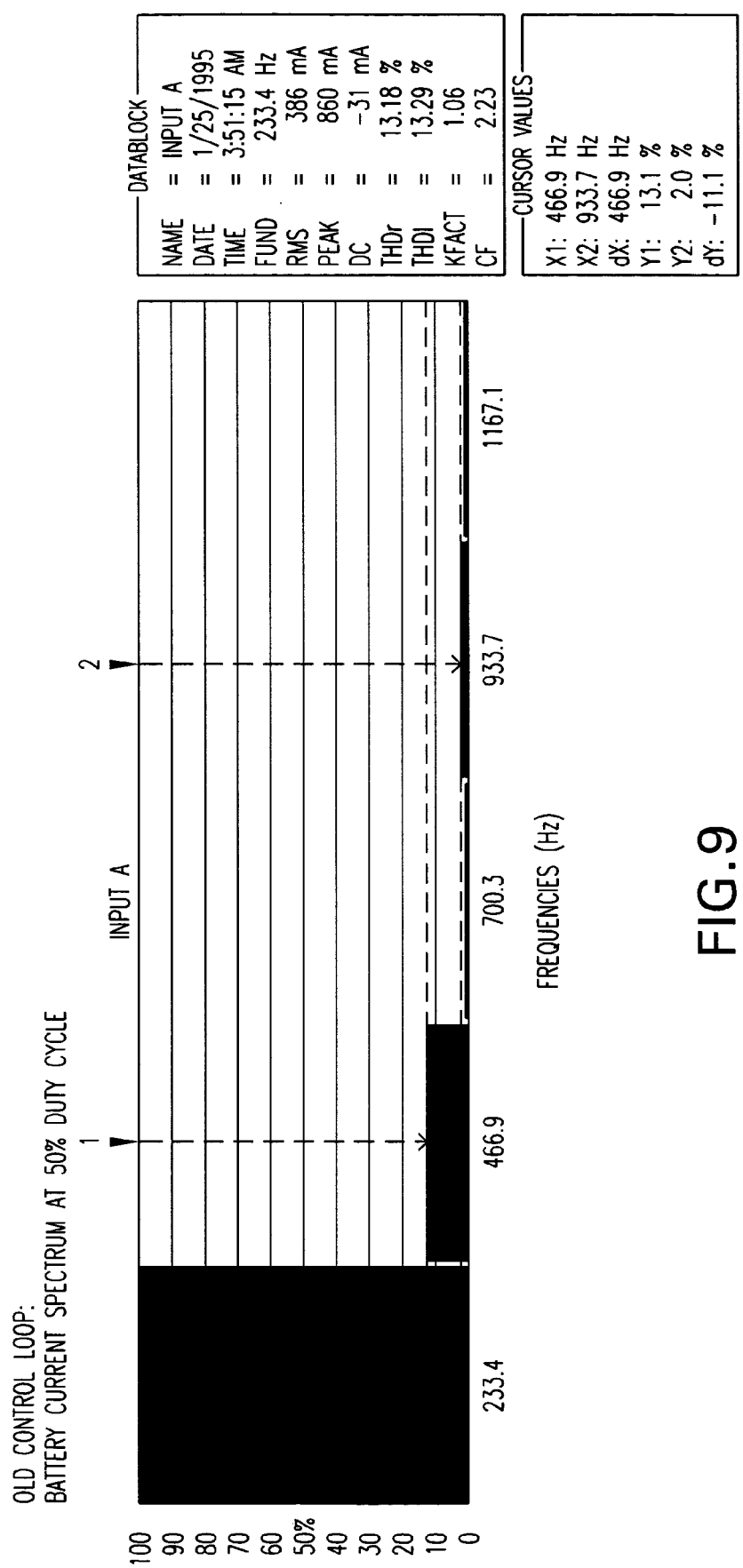
FIG. 9 illustrates a prior art battery current spectrum at 50% duty cycle.
Figure 10:
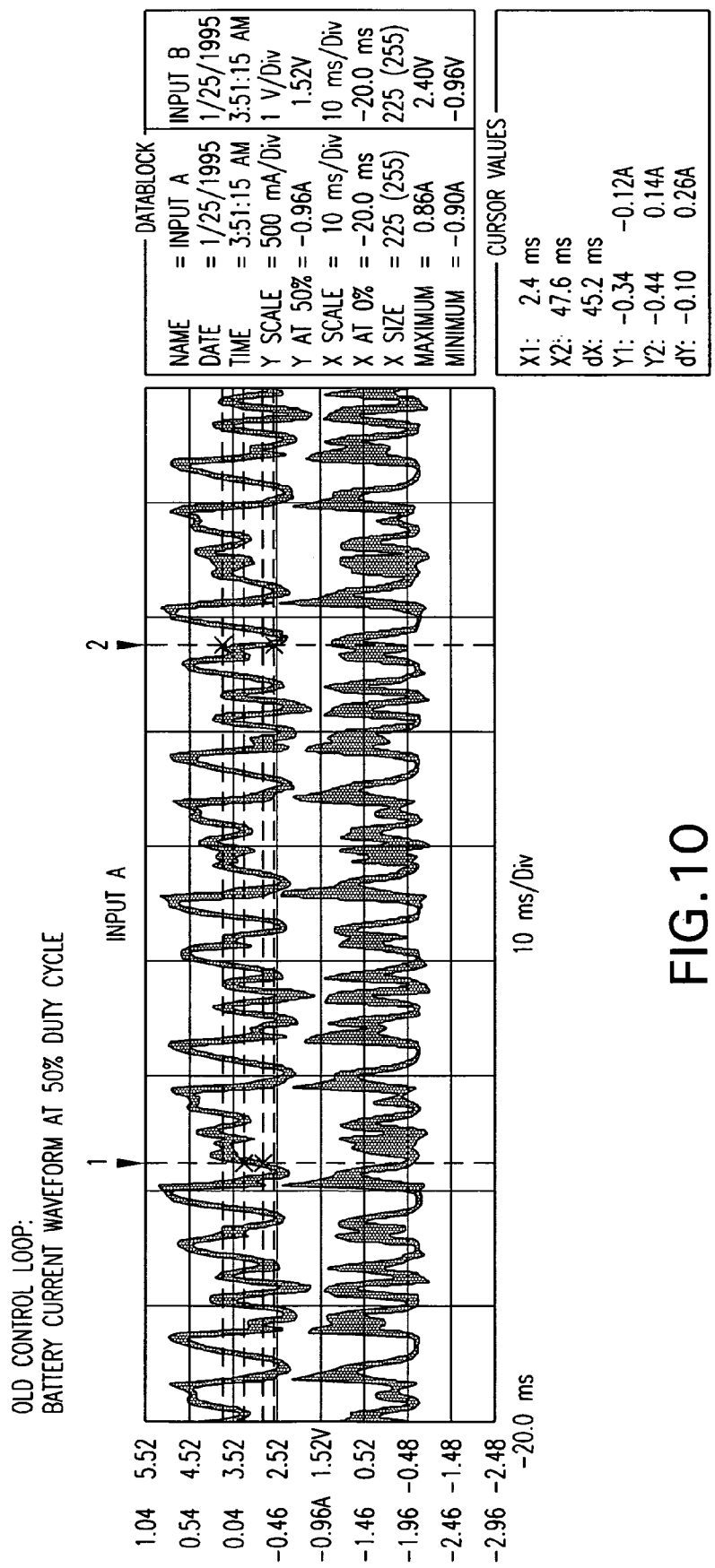
FIG. 10 illustrates a prior art battery current waveform at 50% duty cycle.
Figure 11:
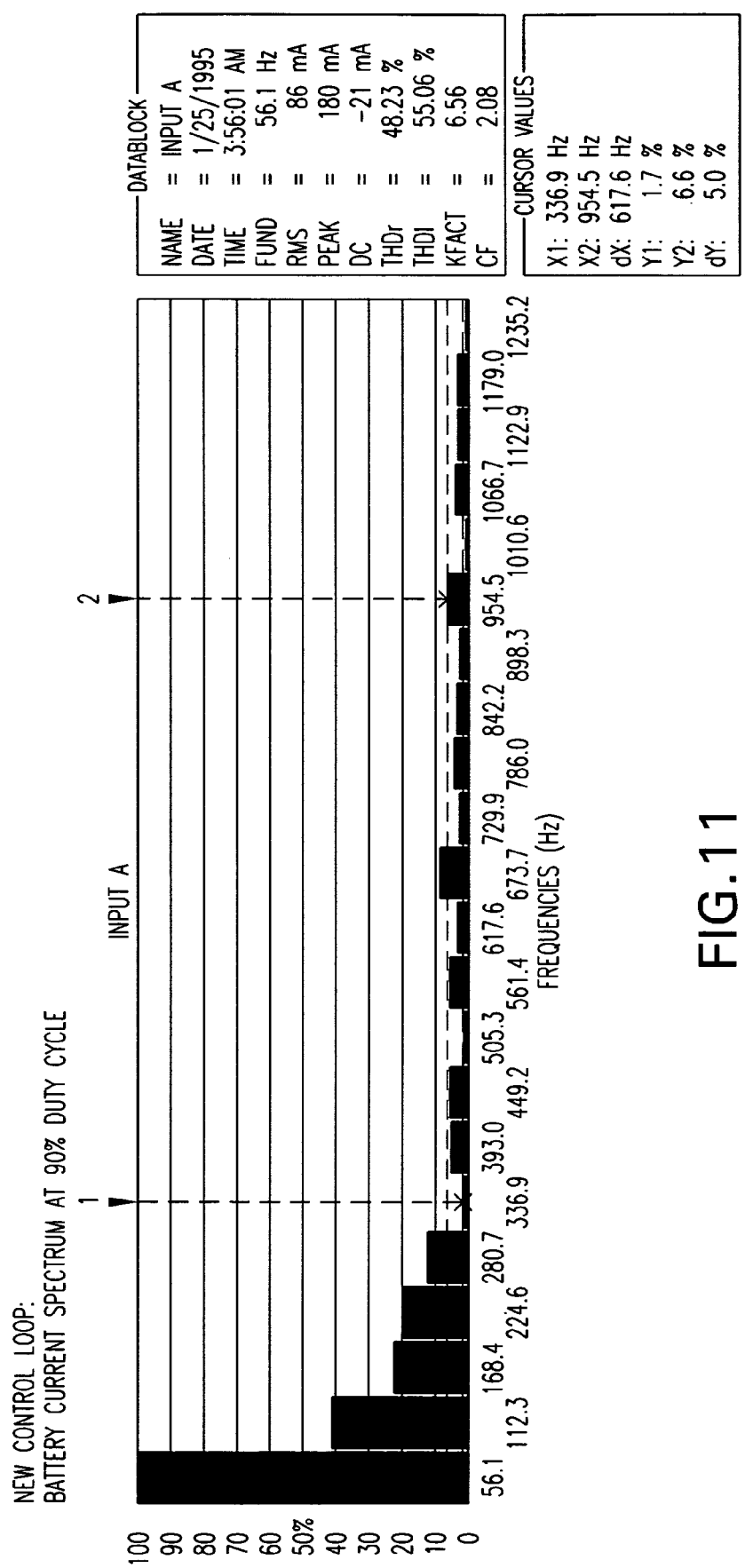
FIG. 11 illustrates a battery current spectrum at 90% duty cycle according to one embodiment of the present invention.
Figure 12:
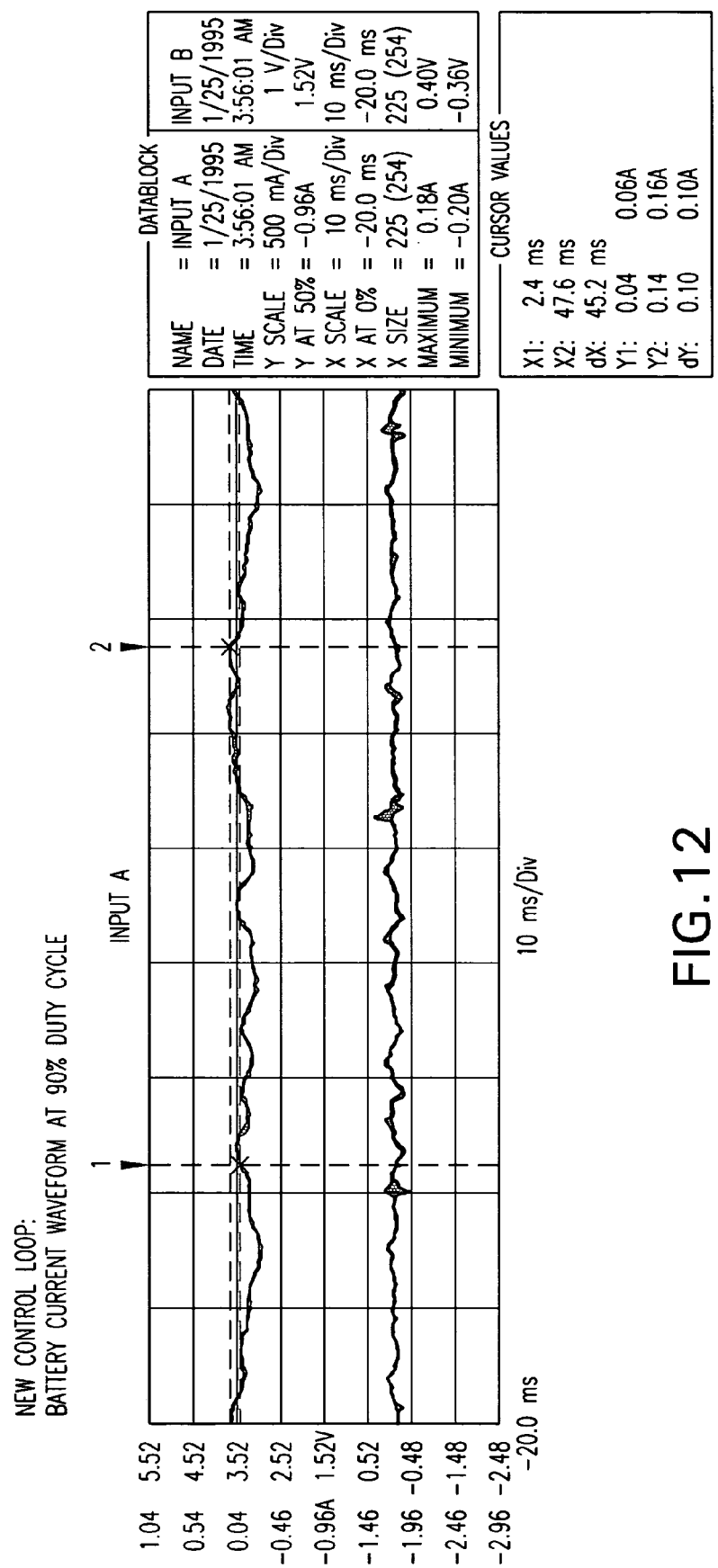
FIG. 12 illustrates a battery current waveform at 90% duty cycle according to one embodiment of the present invention.
Figure 13:
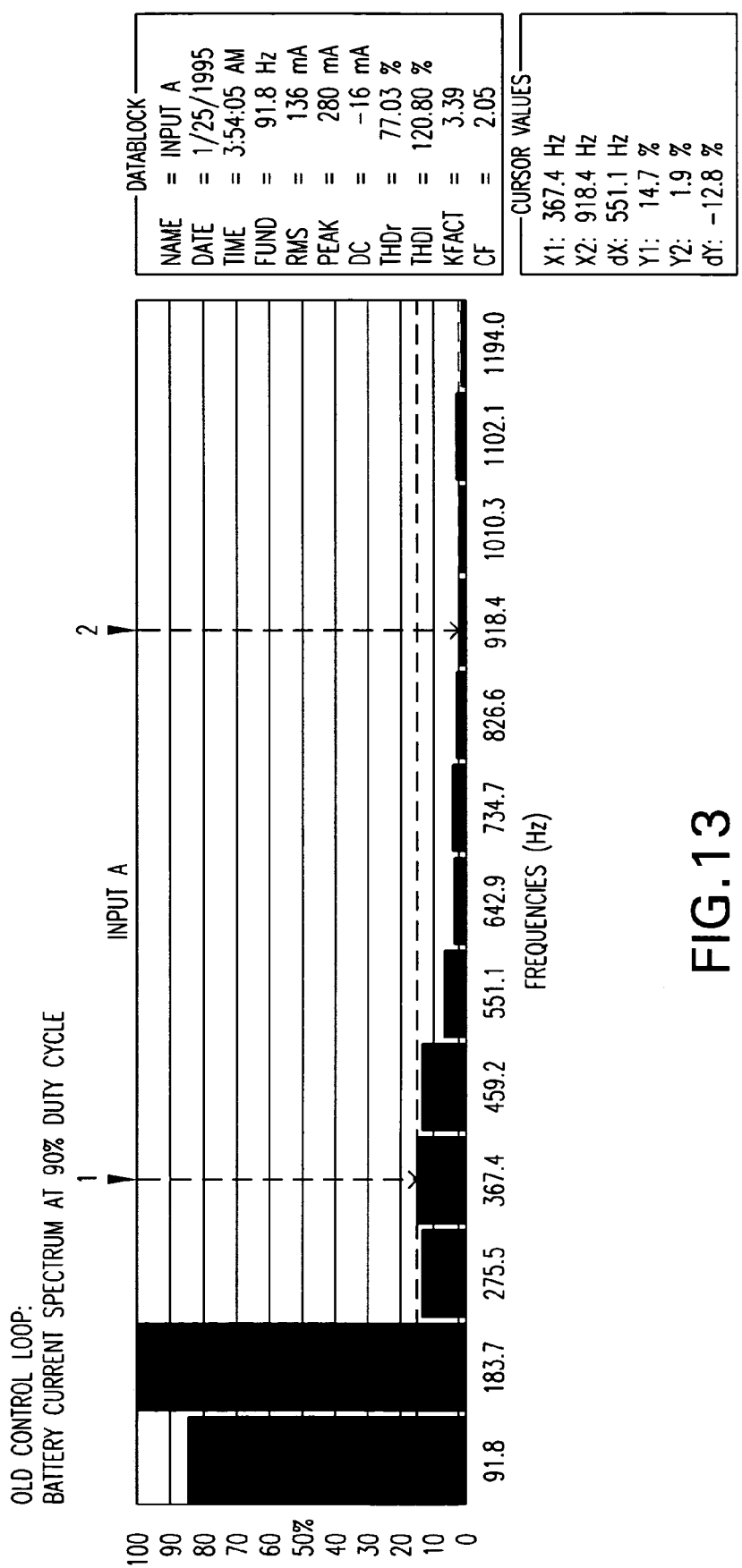
FIG. 13 illustrates a prior art battery current spectrum at 90% duty cycle.
Figure 14:
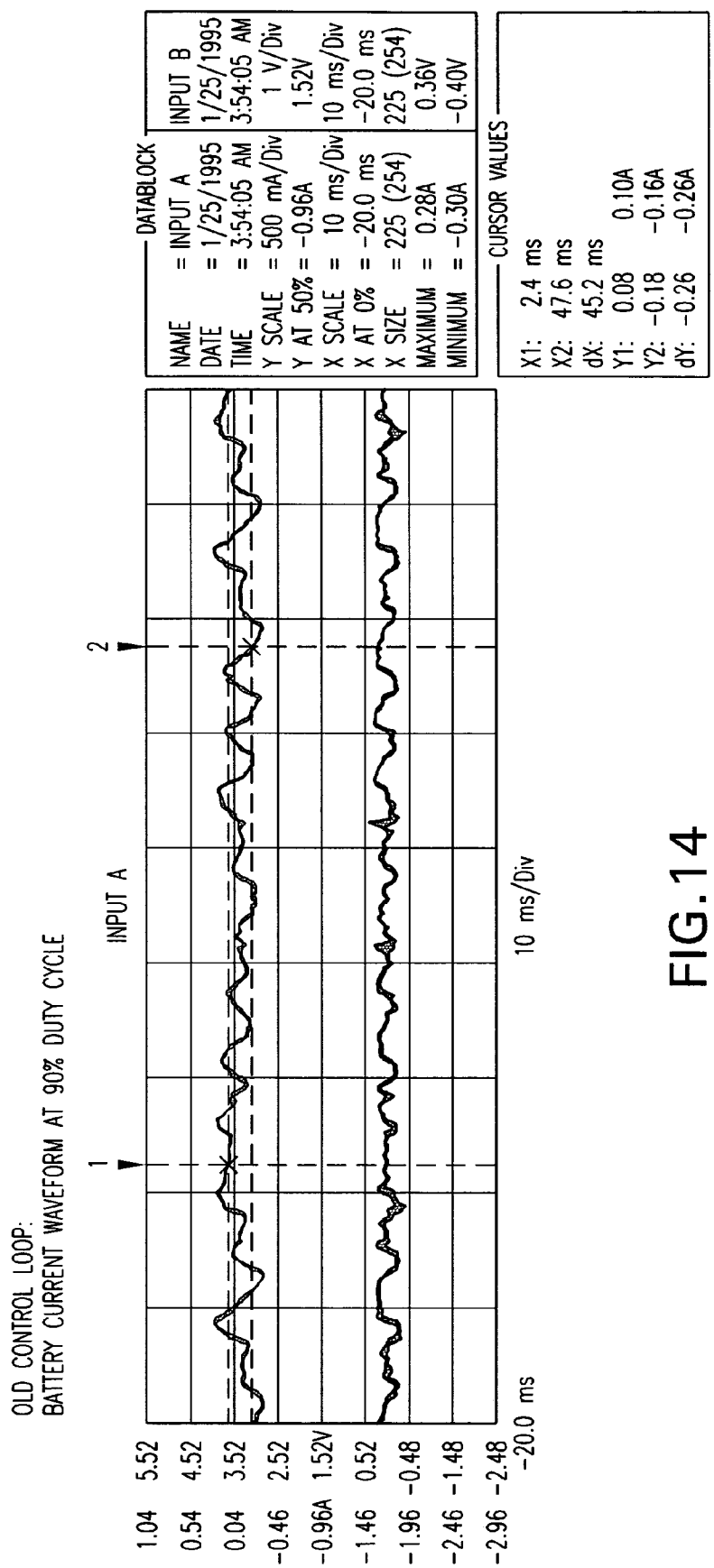
FIG. 14 illustrates a prior art battery current waveform at 90% duty cycle.
Figure 15:
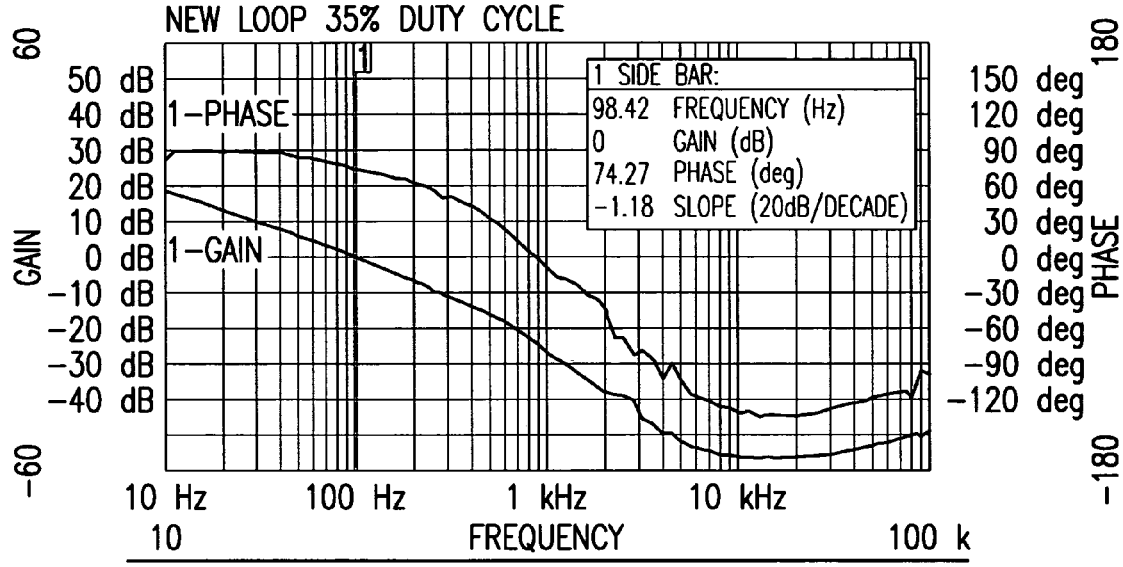
FIG. 15 illustrates a 35% duty cycle of phase-gain measurement according to one embodiment of the present invention.
Figure 16:
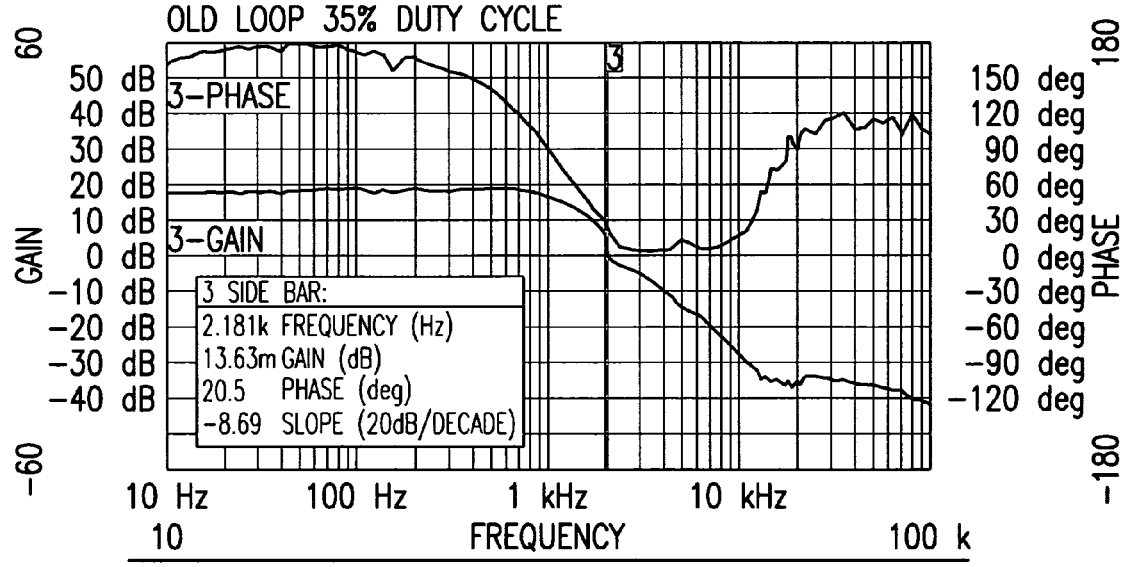
FIG. 16 illustrates a prior art 35% duty cycle of phase-gain measurement.
Figure 17:
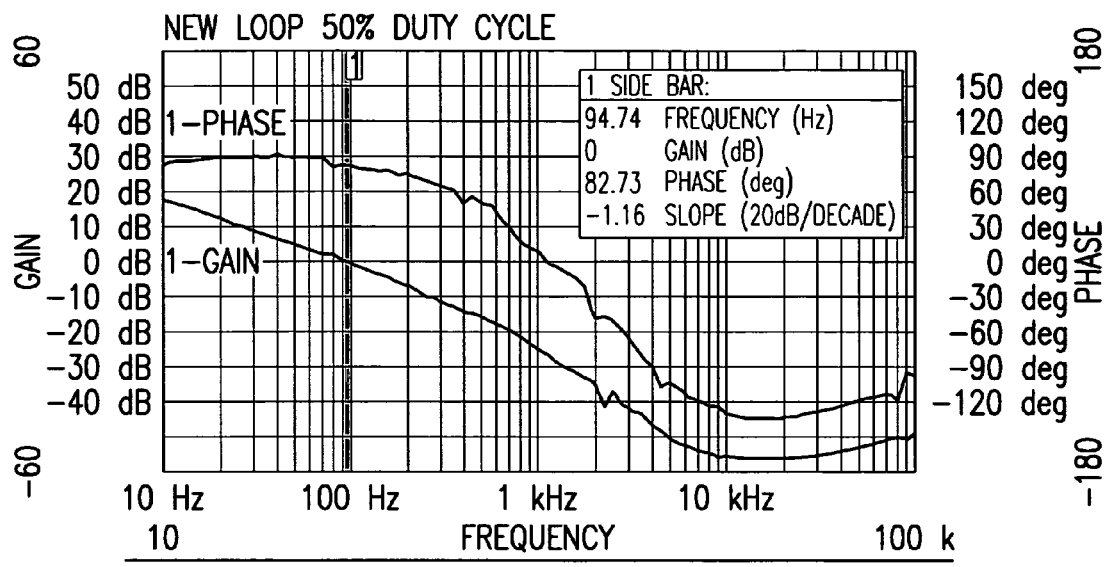
FIG. 17 illustrates a 50% duty cycle of phase-gain measurement according to one embodiment of the present invention.
Figure 18:
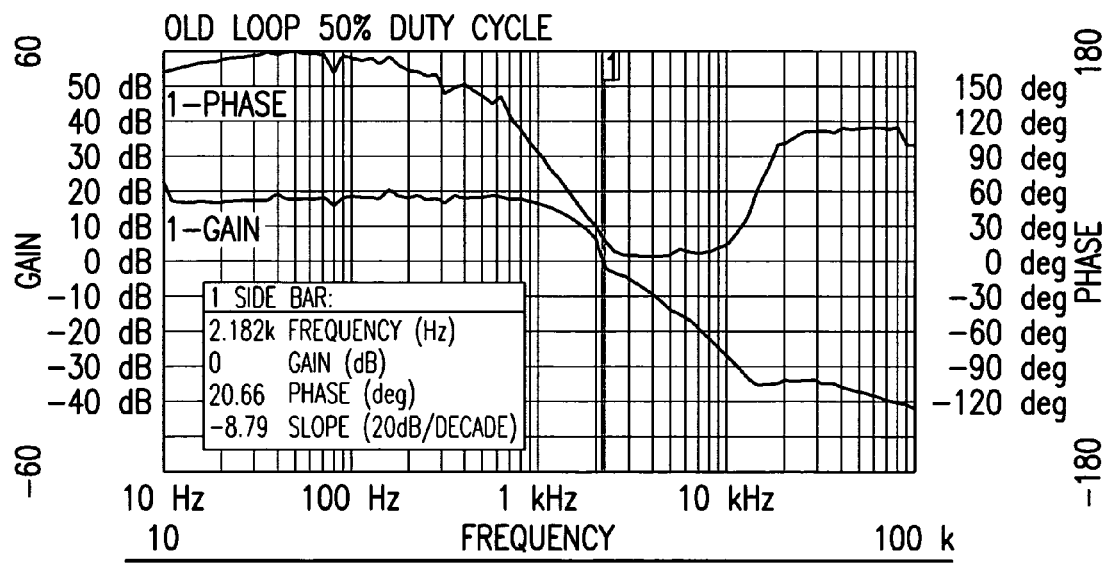
FIG. 18 illustrates a prior art 50% duty cycle of phase-gain measurement.
Figure 19:
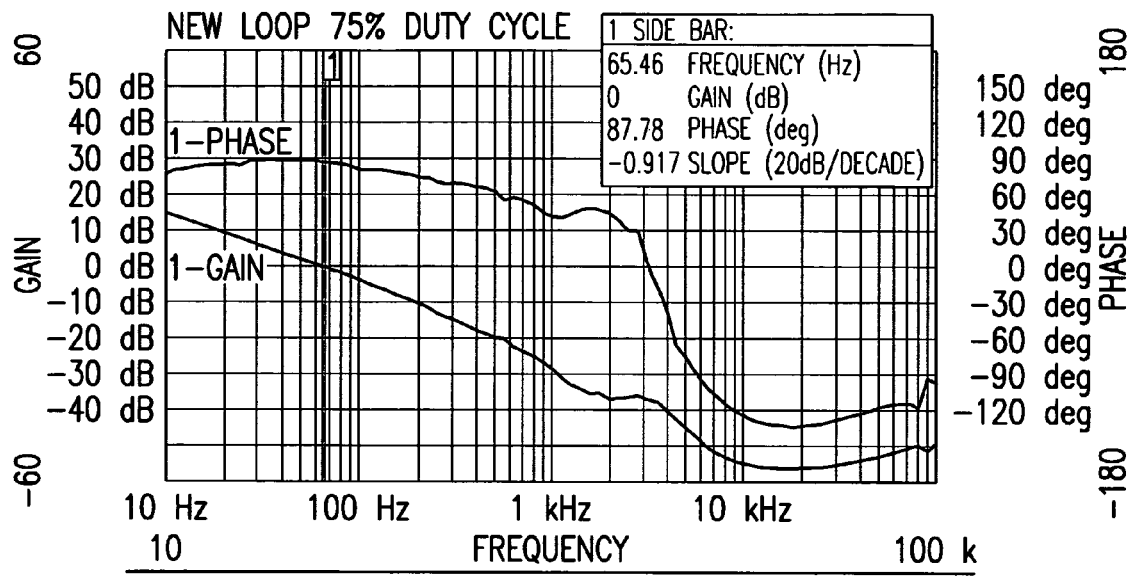
FIG. 19 illustrates a 75% duty cycle of phase-gain measurement according to one embodiment of the present invention.
Figure 20:
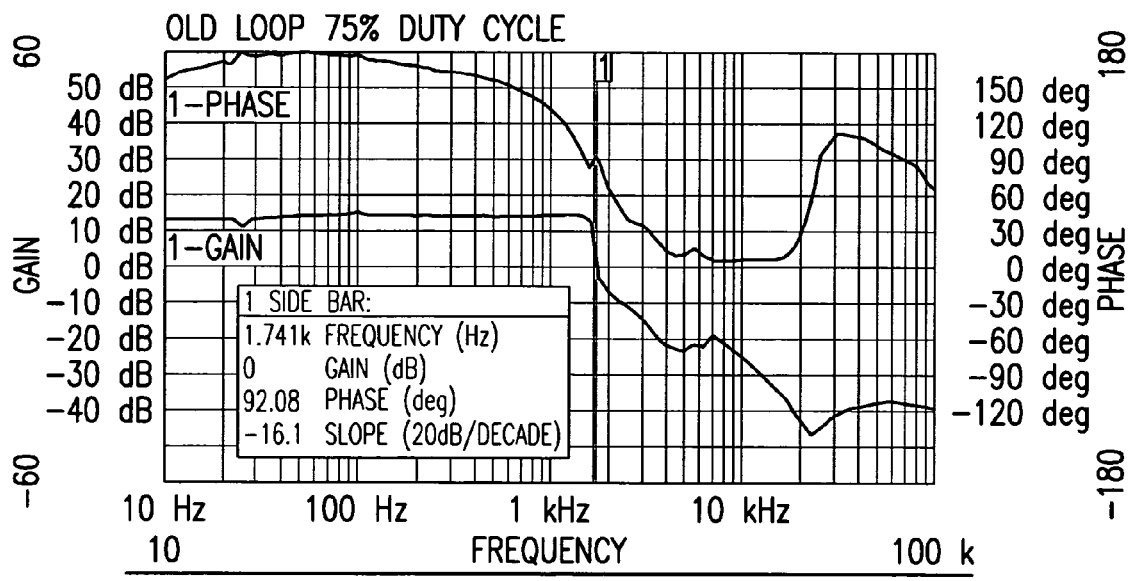
FIG. 20 illustrates a prior art 75% duty cycle of phase-gain measurement.
Figure 21:
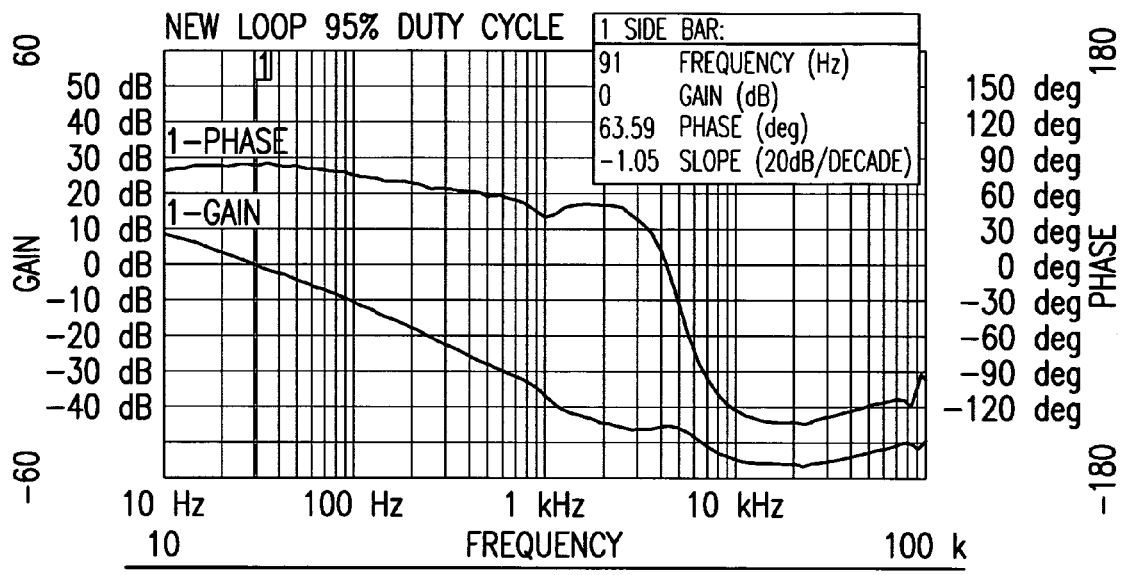
FIG. 21 illustrates a 95% duty cycle of phase-gain measurement according to one embodiment of the present invention.
Figure 22:
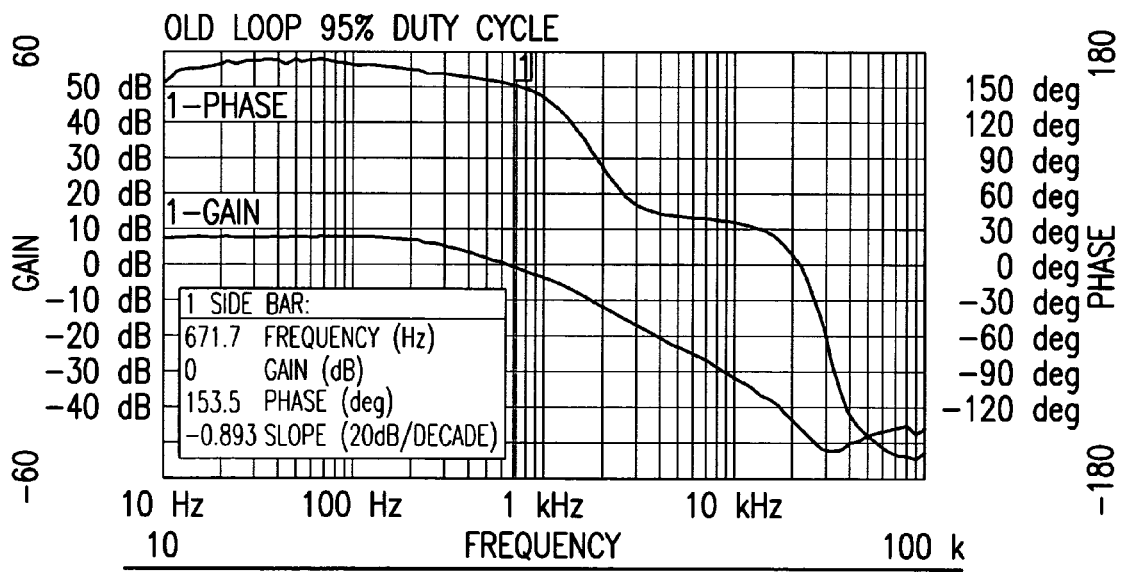
FIG. 22 illustrates a prior art 95% duty cycle of phase-gain measurement.
Figure 23:
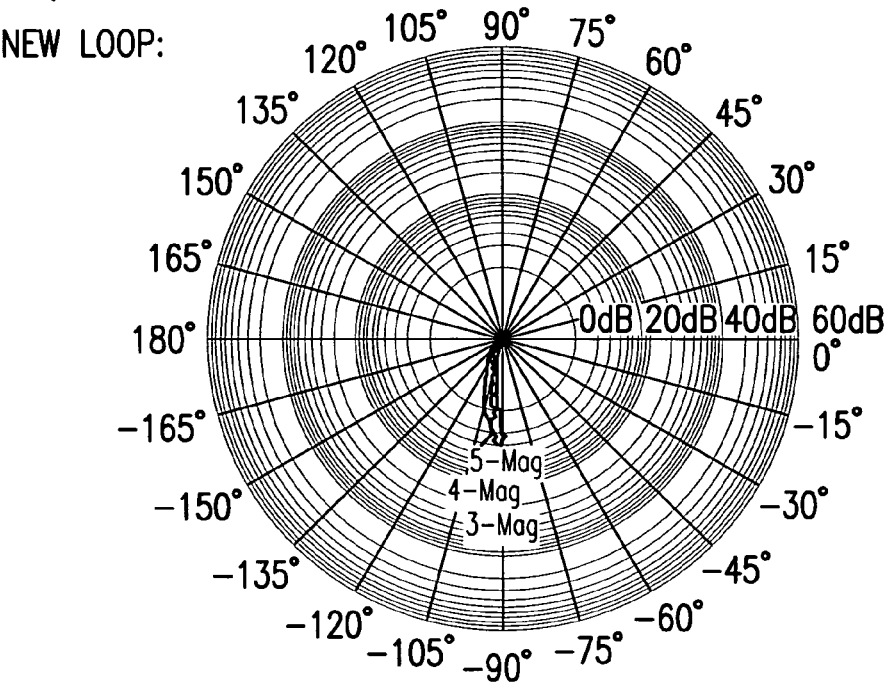
FIG. 23 illustrates a Nyquist chart according to one embodiment of the present the present invention.
Figure 24:
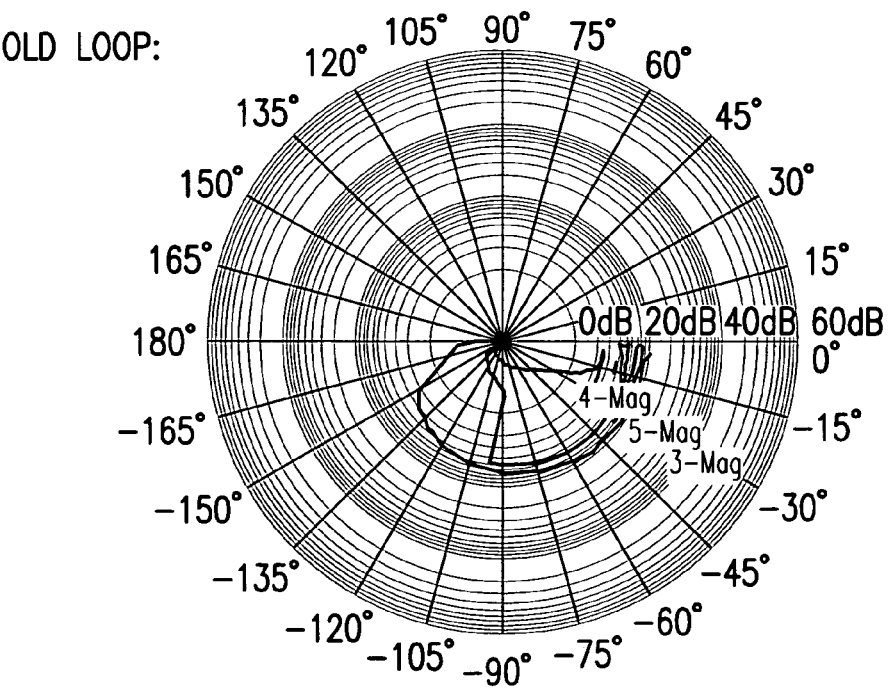
FIG. 24 illustrates a prior art Nyquist chart.

A circuit arrangement based on FIG. 1 is illustratively shown in FIG. 2. FIG. 2 shows a control loop formed with motor 200, resistors 204, 206, 208, 210, 211, 212, 216, capacitors 218, 214, and operational amplifiers 201, 202, and MOSFET 220. In the circuit, capacitor 218, resistor 216, and amplifier 201 are configured to provide an integration amplifier. The circuitry in FIG. 2 is arranged to implement a crossover frequency for the LPM, which can include all components in the diagram except motor 200, that is below the expected motor noise frequency of motor 200 and preferably above a lower motor noise frequency set by other considerations such as those mentioned above. Examples of the operation of a closed loop are illustratively shown in U.S. patent application Ser. No. 10/435,694 filed on May 9, 2003, which is hereby incorporated herein by express reference thereto. Moreover, the operation and implementation of the circuit of FIG. 2 will be readily known to those of ordinary skill in the art in view of the present application. In the circuit of FIG. 2, the LPM output impedance is equal to Z/(1+T), where T is the loop gain of the LPM. If T is high, the LPM has a small impedance and acts as a voltage source and it would support motor noise. Thus, the LPM would have to be configured and adapted to compensate for the effects of motor noise on the operation of the motor. By setting the crossover frequency to be below the motor noise frequency (e.g., at below about 100 Hz for an LPM in an HVAC systems, preferably below about 80 Hz, and more preferably below about 50 Hz, for an LPM in an HVAC systems), the LPM would not have to be configured to compensate for motor noise in the current flowing in the circuit and the LPM output impedance may be equal Z/(1+T), where T<<1 so that output impedance is equal Z.

Figure 33:
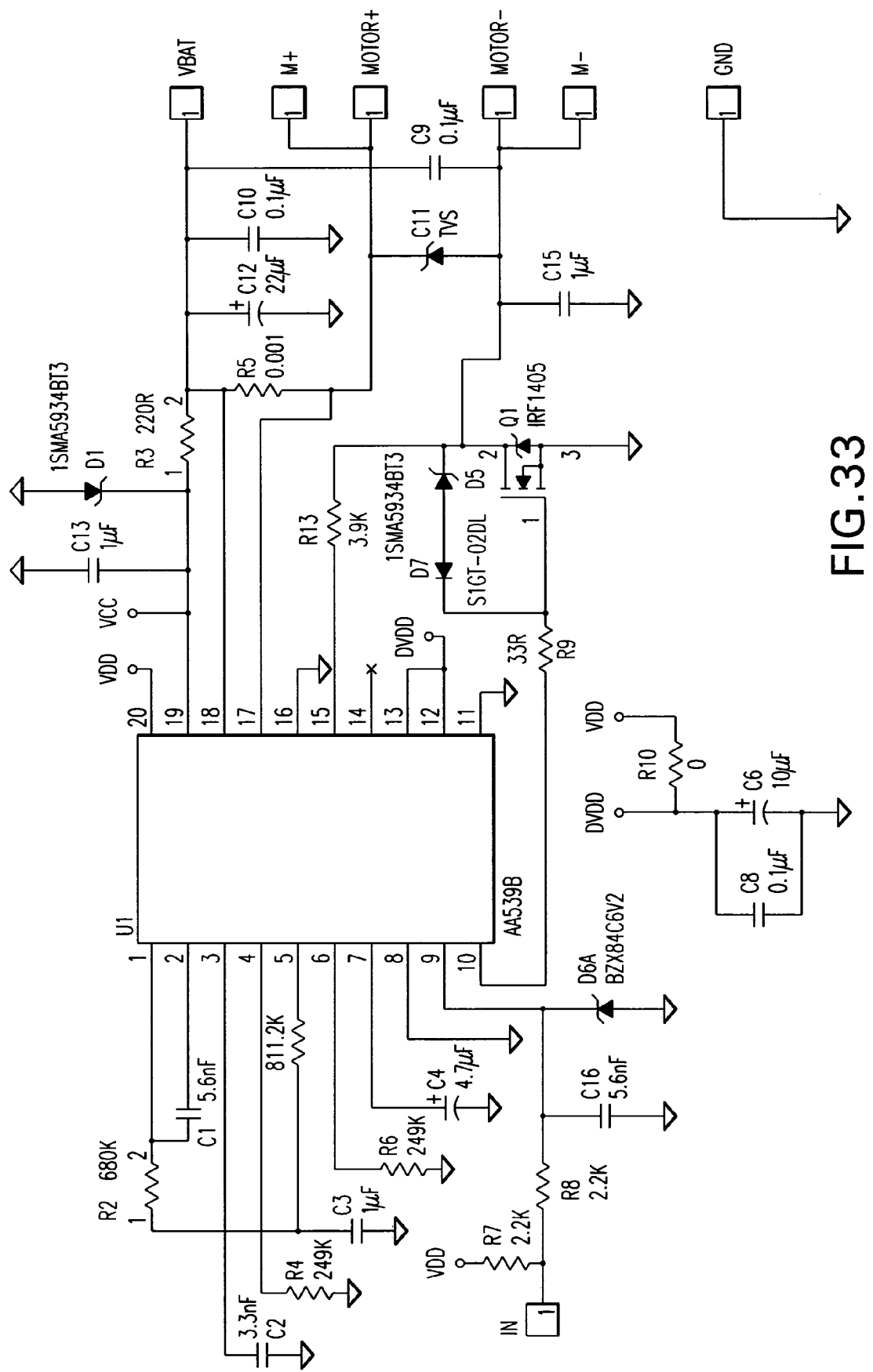
FIG. 33 illustrates an ASIC based LPM in accordance with one embodiment of the present.

An ASIC embodiment of an existing LPM implementation that has a crossover frequency below motor noise (e.g., motor noise of a blower motor in an HVAC system) is illustratively shown with component values in the attached schematic drawing in FIG. 33. Illustrative examples and descriptions of ASIC implementations of LPMs for HVAC systems are illustratively shown in U.S. patent application Ser. No. 10/017,232 filed on Dec. 13, 2001, which is incorporated herein in its entirety by express reference thereto.

Such techniques may also be applicable to control loops that are established using analog circuit components or combinations of analog and digital components. A new LPM according to this invention may therefore have a higher impedance in the frequency range of the motor noise compared to conventional LPMs. Accordingly, the battery current noise will likely be smaller in operation as well due to beneficial effect of the higher impedance on battery current noise.

In known conventional HVAC systems, the crossover frequency is above the expected motor noise frequency (e.g., at about 800 Hz).

Figure 25:
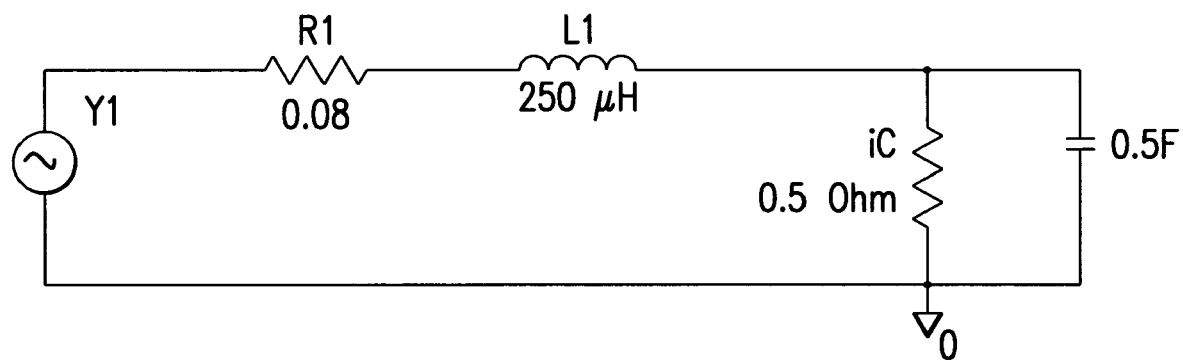
FIG. 25 illustrates a DC motor equivalent model according to one embodiment of the present the invention.
Figure 26:
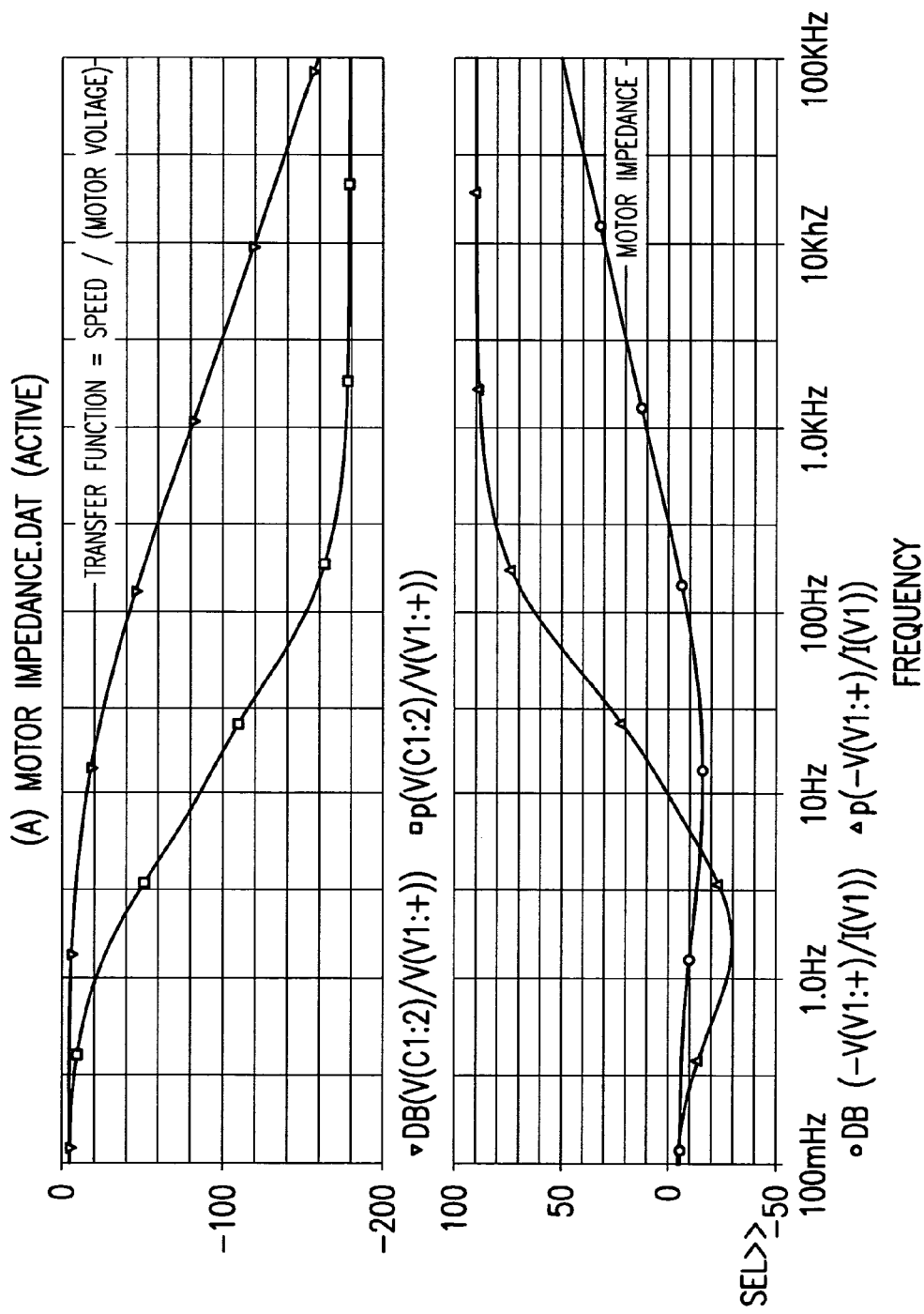
FIG. 26 illustrates motor transfer function and impedance according to one embodiment of the present the invention.
Figure 27:
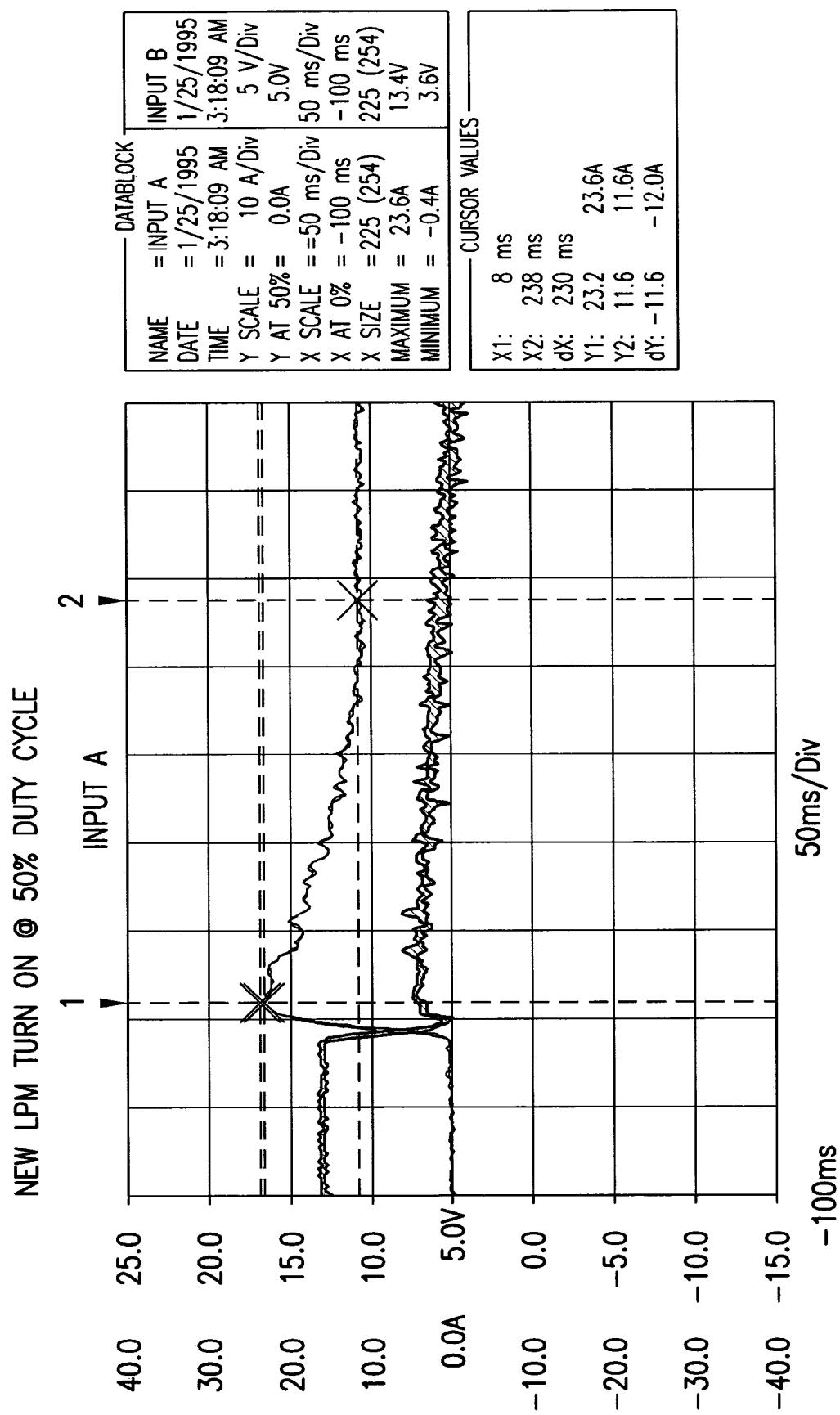
FIG. 27 illustrates an LPM turn on at 50% of duty cycle according to one embodiment of the present the invention.
Figure 28:
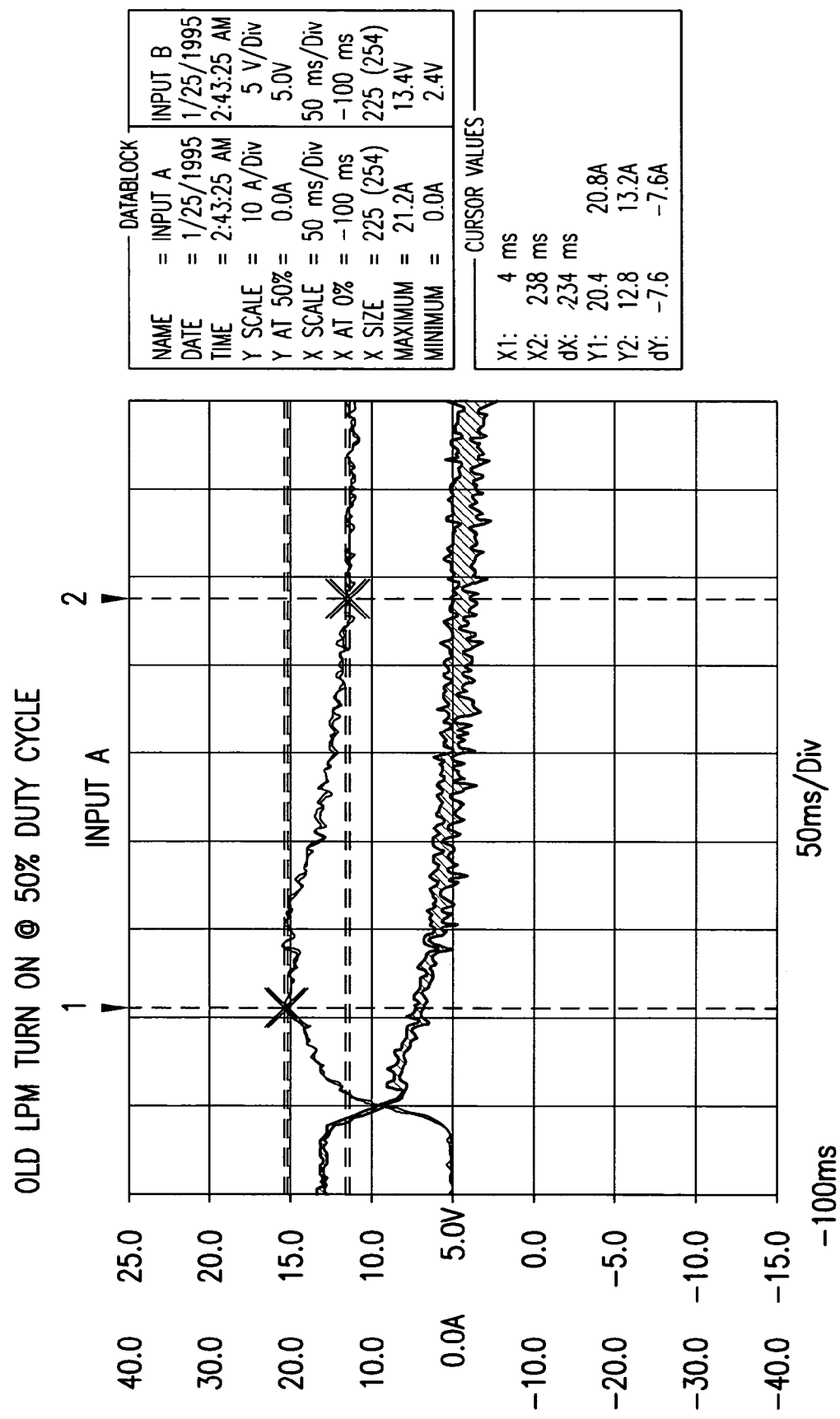
FIG. 28 illustrates a prior art LPM turn on at 50% of duty cycle.
Figure 29:
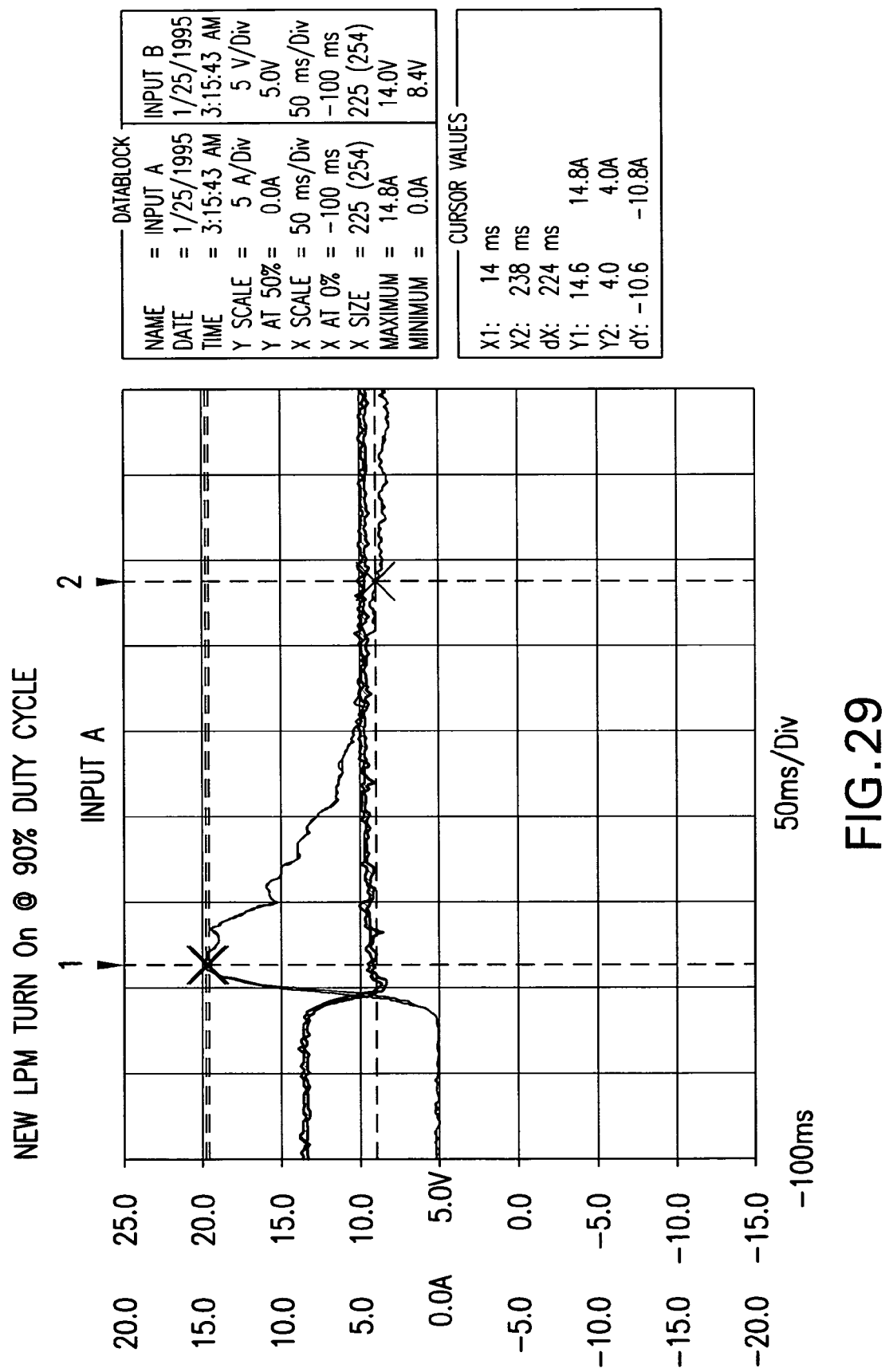
FIG. 29 illustrates an LPM turn on at 90% of duty cycle according to one embodiment of the present the invention.
Figure 30:
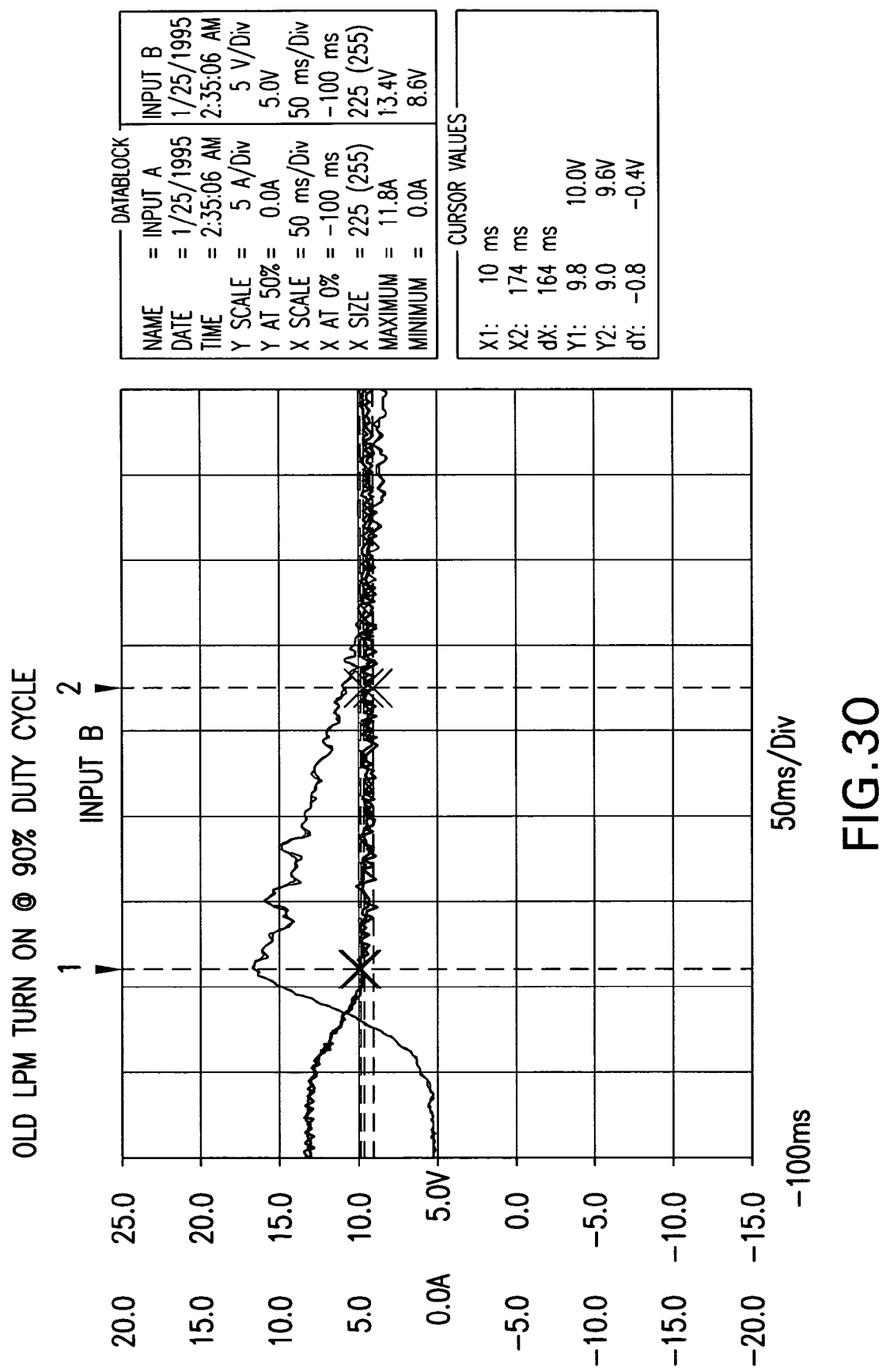
FIG. 30 illustrates a prior art LPM turn on at 90% of duty cycle.
Figure 31:
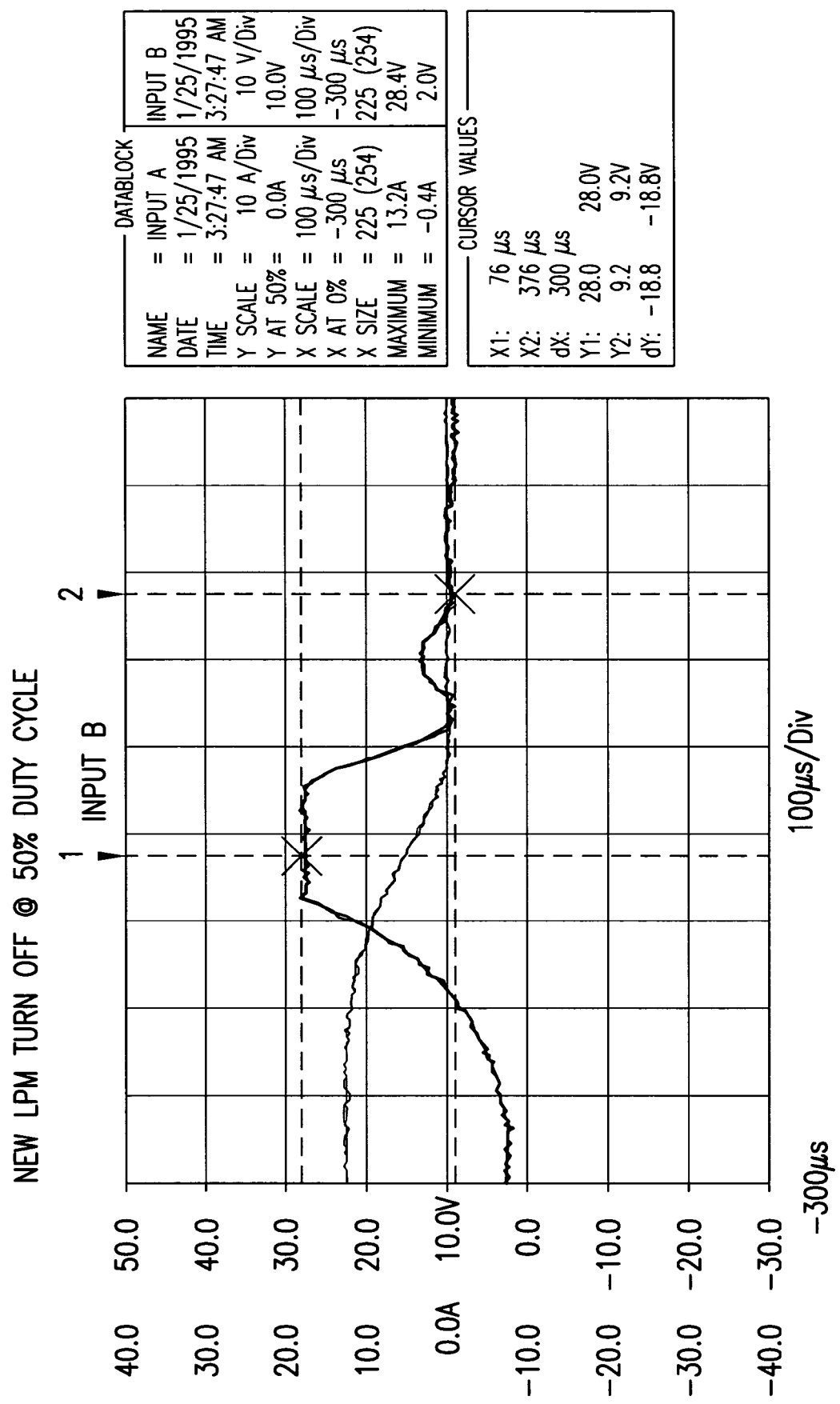
FIG. 31 illustrates an LPM turn off at 50% of duty cycle according to one embodiment of the present the invention.
Figure 32:
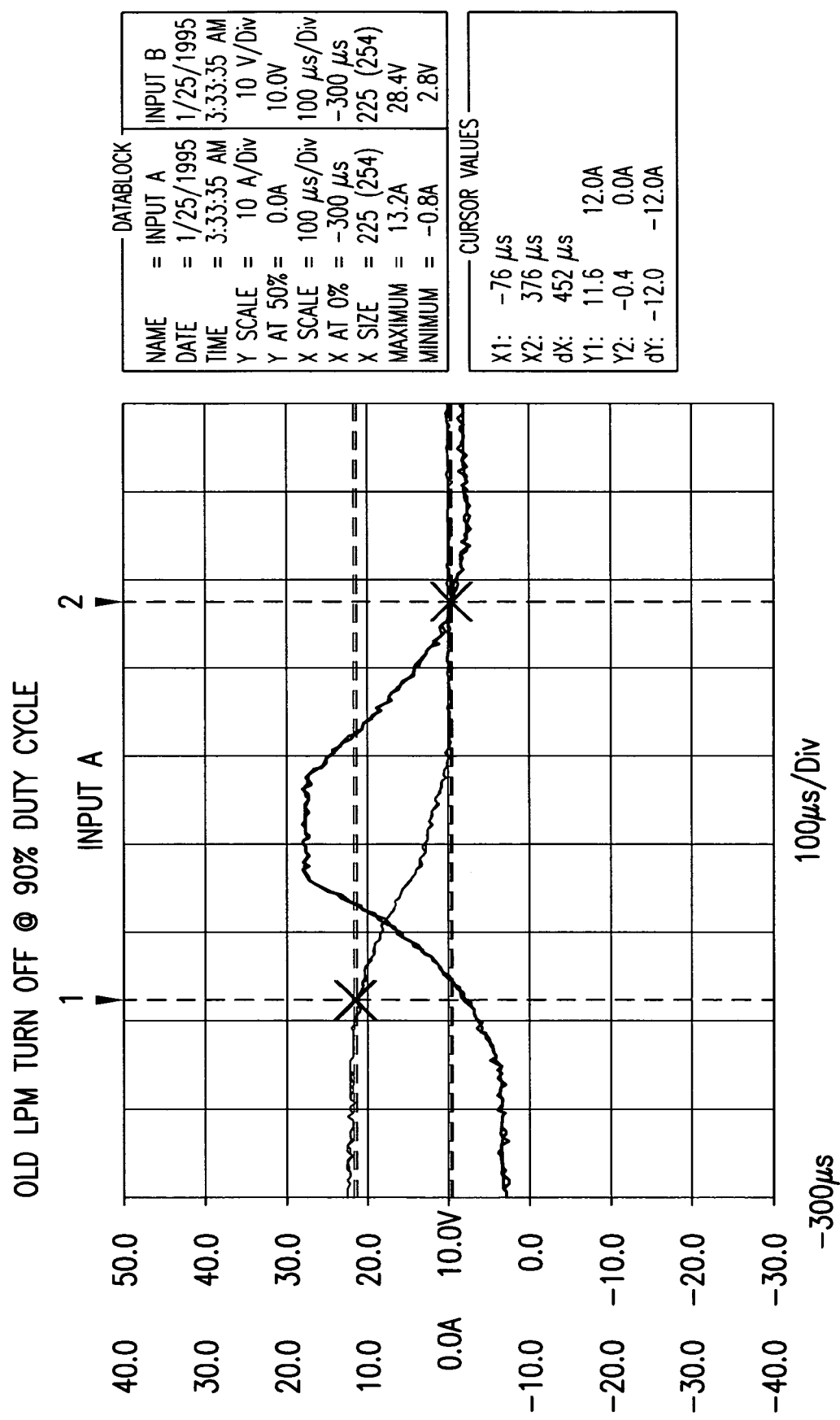
FIG. 32 illustrates a prior art LPM turn off at 90% of duty cycle.

Research and simulation performed comparing the operation of an "old" or conventional LPM in an HVAC system (e.g., one that has a crossover frequency that is above or at the motor noise frequency) and a "new" LPM according to the invention in an HVAC system (e.g., one that conforms to the frequency configurations explained above) provided surprising and unexpected beneficial results as shown. For example, these surprising and unexpected benefits were achieved in an LPM according to the present invention with respect to noise figures, LPM stability, and transient response in Tables 1 and 2, and in FIGS. 3-24 and 27-32. FIGS. 25 and 26 provide information on the simulation design used for the motor in the research and the motor transfer function and impedance.

TABLE 1

| Duty Cycle | High T Spectrum | | Low T Spectrum | | Comparison High T/ Old T | |
|---|---|---|---|---|---|---|
| | RMS (mA) | Peak (mA) | RMS (mA) | Peak (mA) | RMS | Peak |
| 10% | 188 | 420 | 183 | 420 | 1.03 | 1.00 |
| 50% | 386 | 860 | 198 | 640 | 1.95 | 1.34 |
| 90% | 136 | 280 | 86 | 180 | 1.58 | 1.55 |

TABLE 2

| Duty Cycle | Old LPM Phase Margin (deg) | New LPM Phase Margin (deg) | Phase Margin Difference (deg) |
|---|---|---|---|
| 35% | 20 | 74 | 54 |
| 50% | 20 | 82 | 62 |
| 75% | 92 | 87 | −5 |
| 95% | 153 | 84 | −69 |

The techniques illustratively described herein were found to provide suitable operation in the temperature range from about −40° C. to +85° C. particularly for LPMs in HVAC systems. However, those of ordinary skill in the art can apply modifications to obtain a different temperature performance range. Also, the circuitry illustrated herein is not the only implementation contemplated in that those of ordinary skill in the art can construct innumerable circuit variations for functionality contemplated herein.

Thus, an improved LPM can be provided having surprisingly and unexpectedly improved noise performance and stability (phase margin increase), without a significant impact on dynamic performance.

The term "about," as used herein, should generally be understood to refer to both numbers in a range of numerals. Moreover, all numerical ranges herein should be understood to include each whole integer within the range.

Although preferred embodiments of the invention have been illustrated in the accompanying drawings and described in the foregoing Detailed Description of the Preferred Embodiments, it will be understood that the invention is not limited to the embodiments disclosed but is capable of numerous rearrangements and modifications of parts and elements without departing from the spirit of the invention. It will be understood that the details of every design and embodiment may be slightly different or modified by one of ordinary skill in the art without departing from the systems, apparatus, and methods taught by the present invention.

What is claimed is:

1. A method for operating an electric motor, comprising:
configuring a linear motor controller and an electric motor to form a control loop in which the linear motor controller is configured and adapted to have a crossover frequency, above which the controller operates as a current source and below which as a voltage source, and that is below a motor noise frequency of the motor that is expected during normal motor operation in the control loop; and applying variable power to the motor using the linear motor controller to control a speed at which the motor operates.

2. The method of claim 1 wherein the configuring and adapting comprises implementing the control loop in an HVAC system.

3. The method of claim 1 wherein the configuring and adapting comprises using a linear power module for the linear power controller.

4. The method of claim 1 wherein the applying comprises applying power from a battery to the motor.

5. The method of claim 1 wherein the linear motor controller is implemented using an ASIC that controls the speed of the motor.

6. The method of claim 1 wherein the configuring and adapting comprises configuring and adapting the crossover frequency to be substantially below the motor noise frequency and slightly above a frequency at which there is a rush of current during motor startup.

7. The method of claim 1 wherein the linear motor controller comprises a power semiconductor device.

8. An apparatus for controlling an electric motor, comprising:
a linear motor controller that is configured and adapted to form a control loop when operably connected to an electric motor, and is configured and adapted to have a crossover frequency, above which the controller operates as a current source and below which as voltage a source, and that is below a motor noise frequency of the electric motor that is expected during normal motor operation in the control loop; and
circuitry for applying variable power to the motor using the linear motor controller to control a speed at which the motor operates.

9. The apparatus of claim 8 wherein the linear motor controller is part of an HVAC system.

10. The apparatus of claim 8 wherein the linear motor controller is a linear power module.

11. The apparatus of claim 8 wherein the linear motor controller is configured and adapted to be battery powered.

12. The apparatus of claim 8 wherein the linear motor controller is implemented using an ASIC that controls the speed of the motor.

13. The apparatus of claim 8 wherein the crossover frequency is configured to be substantially below the motor noise frequency and slightly above a frequency at which there is a rush of current during motor startup.

14. The apparatus of claim 8 wherein the linear motor controller comprises a power semiconductor device.

15. A variable speed, electric motor power module comprising control loop circuitry that forms a control loop with a motor when operating and is configured and adapted to have a crossover frequency, above which the controller operates as a current source and below which as a voltage source, and that is below a motor noise frequency.

16. A method for operating a variable speed, electric motor power module which comprises configuring and adapting the power module to have a crossover frequency, above which the controller operates as a current source and below which as a voltage source, that is below a motor noise frequency when the power module is driving the motor.

17. A system for driving a motor which comprises arranging circuitry to drive an electric motor with a control loop formed with the circuitry, where the control loop is configured and adapted to have a crossover frequency, above which the controller operates as a current source and below which as a voltage source, that is below a motor noise frequency.

* * * * *